(12) United States Patent
Li et al.

(10) Patent No.: US 10,096,127 B2
(45) Date of Patent: Oct. 9, 2018

(54) CLASSIFYING IMAGE SAMPLES

(71) Applicant: Nokia Technologies Oy, Espoo (FI)

(72) Inventors: Jiangwei Li, Beijing (CN); Lei Xu, Beijing (CN); Yikai Fang, Beijing (CN); Kongqiao Wang, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 246 days.

(21) Appl. No.: 14/431,927

(22) PCT Filed: Oct. 22, 2012

(86) PCT No.: PCT/CN2012/083275
§ 371 (c)(1),
(2) Date: Mar. 27, 2015

(87) PCT Pub. No.: WO2014/063278
PCT Pub. Date: May 1, 2014

(65) Prior Publication Data
US 2015/0243049 A1    Aug. 27, 2015

(51) Int. Cl.
*G06K 9/00* (2006.01)
*G06T 7/40* (2017.01)
*G06K 9/62* (2006.01)
*G06K 9/46* (2006.01)

(52) U.S. Cl.
CPC .......... *G06T 7/408* (2013.01); *G06K 9/00355* (2013.01); *G06K 9/4652* (2013.01); *G06K 9/6262* (2013.01); *G06K 9/6267* (2013.01); *G06K 9/6278* (2013.01); *G06K 9/6282* (2013.01); *G06T 2207/10024* (2013.01)

(58) Field of Classification Search
CPC ............. G06K 9/00355; G06K 9/4652; G06K 9/6262; G06K 9/6267; G06K 9/6278; G06K 9/6282; G06K 9/00234; G06K 9/00375–9/00389; G06T 7/90; G06T 7/408
See application file for complete search history.

(56) References Cited

U.S. PATENT DOCUMENTS

| 3,100,815 A | 8/1963 | Drake et al. |
| 5,751,843 A | 5/1998 | Maggioni et al. |

(Continued)

FOREIGN PATENT DOCUMENTS

| CN | 101561867 A | 10/2009 |
| CN | 101587591 A | 11/2009 |

(Continued)

OTHER PUBLICATIONS

Chai et al "Face segmentation using skin color map in video phone applications" IEEE 1999.*

(Continued)

*Primary Examiner* — Sean Motsinger
(74) *Attorney, Agent, or Firm* — Alston & Bird LLP

(57) ABSTRACT

It is inter alia disclosed to classify samples of a set of samples of an image regarding whether or not a respective sample comprises optical information on a specific object type based on classification information. Therein, the classification information comprises a plurality of classifiers, each classifier being associated exclusively with one color channel of a plurality of color channels.

18 Claims, 6 Drawing Sheets

(56) References Cited

U.S. PATENT DOCUMENTS

| | | | | |
|---|---|---|---|---|
| 6,226,409 | B1* | 5/2001 | Cham | G06K 9/6217 382/228 |
| 6,774,889 | B1* | 8/2004 | Zhang | G06F 3/0425 345/156 |
| 6,847,731 | B1* | 1/2005 | Caulfield | G06K 9/741 382/159 |
| 7,609,908 | B2* | 10/2009 | Luo | H04N 1/6027 345/58 |
| 2001/0028737 | A1 | 10/2001 | Takakura et al. | |
| 2002/0012449 | A1* | 1/2002 | Bradski | G06K 9/00234 382/103 |
| 2004/0218832 | A1* | 11/2004 | Luo | H04N 1/6027 382/274 |
| 2004/0258306 | A1* | 12/2004 | Hashimoto | G06K 9/3216 382/181 |
| 2006/0088207 | A1 | 4/2006 | Schneiderman | |
| 2008/0091639 | A1* | 4/2008 | Davis | G06Q 30/02 |
| 2008/0107341 | A1* | 5/2008 | Lu | G06K 9/00248 382/190 |
| 2009/0252435 | A1* | 10/2009 | Wen | G06K 9/00228 382/284 |
| 2009/0290762 | A1* | 11/2009 | Guan | G06K 9/00362 382/107 |
| 2010/0329509 | A1 | 12/2010 | Fahn et al. | |
| 2011/0135147 | A1 | 6/2011 | Eswara et al. | |
| 2011/0142338 | A1* | 6/2011 | Do | G06K 9/00362 382/165 |
| 2012/0022844 | A1* | 1/2012 | Teixeira | A61B 5/0205 703/11 |
| 2012/0027263 | A1 | 2/2012 | Liu et al. | |
| 2014/0219558 | A1* | 8/2014 | Teng | G06T 9/00 382/166 |
| 2015/0131879 | A1* | 5/2015 | Lu | A61B 5/004 382/128 |
| 2015/0243049 | A1* | 8/2015 | Li | G06K 9/00355 382/165 |
| 2016/0283784 | A1* | 9/2016 | Kounavis | G06K 9/00355 |

FOREIGN PATENT DOCUMENTS

| | | |
|---|---|---|
| CN | 101789125 A | 7/2010 |
| CN | 101867699 A | 10/2010 |
| CN | 102103690 A | 6/2011 |
| CN | 102360432 A | 2/2012 |
| CN | 102509073 A | 6/2012 |
| CN | 102663451 A | 9/2012 |
| EP | 0775978 A2 | 5/1997 |
| EP | 1918850 A2 | 5/2008 |
| KR | 100764436 B1 | 10/2007 |
| WO | 2012/139241 A1 | 10/2012 |

OTHER PUBLICATIONS

International Search Report and Written Opinion received for corresponding Patent Cooperation Treaty Application No. PCT/CN2012/083275, dated Aug. 1, 2013, 11 pages.

Office action received for corresponding Chinese Patent Application No. 201280076397.1, dated Aug. 2, 2016, 9 pages of office action and 4 pages of office action translation available.

"GestureTek Labs: Patent and Technology Licensing Program", GestureTek, Retrieved on Sep. 29, 2016, Webpage available at :http://www.gesturetek.com/products/technologyandlicensing.php.

"Eyesight", Eyesight, Retrieved on Sep. 29, 2016, Webpage available at : http://eyesight-tech.com/.

Bretzner et al., "Hand Gesture Recognition Using Multi-Scale Colour Features", Hierarchical Models and Particle Filtering, Fifth IEEE International Conference on Automatic Face and Gesture Recognition, May 21-22, 2002, pp. 1-6.

Zarit et al., "Comparison of Five Color Models in Skin Pixel Classification", International Workshop on Recognition, Analysis, and Tracking of Faces and Gestures in Real-Time Systems—RATFG, 1999, 6 pages.

Ruiz-Del-Solar et al., "Skin Detection Using Neighborhood Information", Proceedings. Sixth IEEE International conference on Automatic Face and Gesture Recognition, May 19, 2004, 6 pages.

Bo et al., "Robust Hand Tracking in Low-resolution Video Sequences", Proceedings of the third conference on IASTED International Conference: Advances in Computer Science and Technology, Apr. 2-4, 2007, 6 pages.

Rautaray et al., "A Real Time Hand Tracking System for Interactive Applications", International Journal of Computer Applications, vol. 18,No. 6, Mar. 2011, pp. 28-33.

Dadgostar et al., "An Adaptive Real-Time Skin Detector Based on Hue Thresholding: A Comparison on Two Motion Tracking Methods", Pattern Recognition Letters, vol. 27, No. 12, Sep. 2006, pp. 1342-1352.

Francke et al., "Real-Time Hand Gesture Detection and Recognition Using Boosted Classifiers and Active Learning", Proceedings of the 2nd Pacific Rim conference on Advances in image and video technology, 2007, 14 pages.

Chen, "Real-Time Vision-Based Hand Tracking and Gesture Recognition", Thesis, 2008, 117 pages.

Chen et al., "Real-Time Vision-Based Hand Gesture Recognition Using Haar-like Features", IEEE Instrumentation & Measurement Technology Conference IMTC, May 1-3, 2007, 6 pages.

Extended European Search Report received for corresponding European Patent Application No. 12887140.7, dated Jul. 7, 2016, 8 pages.

Lu et al., "Skin Detection Method Based on Cascaded AdaBoost Classifier", Journal of Shanghai Jiaotong University (Science), vol. 17, No. 2, Apr. 2012, pp. 197-202.

Phung et al., "Skin Segmentation Using Color Pixel Classification: Analysis and Comparison", IEEE Transactions on Pattern Analysis and Machine Intelligence, vol. 27, No. 1, Jan. 2005, pp. 148-154.

Maenpaa et al., "Classification With Color and Texture: Jointly or Separately", Pattern Recognition, vol. 37, No. 8, Aug. 2004, pp. 1629-1640.

Vezhnevets et al., "A Survey on Pixel-Based Skin Color Detection Techniques", In Proceedings of Graphicon, Sep. 2003, 8 pages.

Xbox Kinect Full Body Gaming and Voice Control [online] [retrieved Jun. 7, 2017]. Retrieved from the Internet: <URL:https://web.archive.org/web/20140801142055/http://www.xbox.com/en-US/KINECT>. (dated Aug. 1, 2014) 3 pages.

Office action received for corresponding Chinese Patent Application No. 201280076397.1, dated Feb. 23, 2017, 9 pages of office action and 3 pages of translation available.

Bing et al., "Study on Skin Area Detection Based on Color Feature Extraction and Texture Feature Extraction", Wanfang Academic Papers, Jul. 10, 2006, 17 Pages.

Office Action for corresponding Chinese Application No. 201280076397.1 dated Jul. 26, 2017, 11 pages.

Office Action from corresponding European Patent Application No. 12887140.7 dated Nov. 13, 2017, 5 pages.

* cited by examiner

CLASSIFYING IMAGE SAMPLES

RELATED APPLICATION

This application was originally filed as Patent Cooperation Treaty Application No. PCT/CN2012/083275 filed Oct. 22, 2012.

FIELD

This invention relates to classifying samples of a set of samples of an image regarding whether or not the respective sample comprises optical information on a specific object based on classification information.

BACKGROUND

Many image processing applications require classifying image samples regarding whether or not a respective sample comprises optical information on a specific object type. An approach to classifying image samples is mainly based on the colour associated with each of the image samples.

One example of such an image processing application is an image processing application that aims at segmentation of concrete objects of the specific object type depicted in an image. Having segmented the concrete object in the image, the segmented object may be exploited in a subsequent image processing step. For instance, segmenting the concrete object in several images of an image sequence may serve as a basis for tracking the object in the image sequence.

Classifying image samples regarding whether or not they comprise optical information on a specific object type is however in many cases not an easy task and therefore error-prone. For instance, an image may one the one hand comprise samples comprising optical information on the specific object type and on the other hand it may comprise samples comprising information on other object types, i.e. other image content. In most cases, it is not known in advance which other image content is contained in an image on which classifying samples of a set of samples of the image regarding whether or not a respective sample comprises optical information on a specific object type based on classification information is to be performed. This may complicate distinguishing pixels comprising optical information on the specific object type from pixels not comprising optical information on the specific object type. Moreover, varying lighting conditions may cause the specific object type to appear differently in different images, thus affecting optical information on the specific object type comprised in samples of the different images. Another problem is that concrete objects of the specific object type often vary in their appearance. This may further complicate correct classification of image samples.

SUMMARY OF SOME EMBODIMENTS OF THE INVENTION

Improving classifying samples of a set of samples of an image regarding whether or not the respective sample comprises optical information on a specific object type based on classification information is desirable.

According to a first aspect of the invention, a method is disclosed, the method comprises classifying samples of a set of samples of an image regarding whether or not a respective sample comprises optical information on a specific object type based on classification information, wherein the classification information comprises a plurality of classifiers, each classifier being associated exclusively with one colour channel of a plurality of colour channels.

According to a second aspect of the invention, a computer program is disclosed. The computer program comprises program code for performing the method according to the first aspect of the invention when the computer program is executed on a processor.

The computer program may for instance be distributable via a network, such as for instance the Internet. The computer program may for instance be storable or encodable in a computer-readable medium. The computer program may for instance at least partially represent software and/or firmware of the processor.

According to a third aspect of the invention, a computer-readable medium is disclosed. The computer-readable medium has a computer program according to the first aspect of the present invention stored thereon.

The computer-readable medium may for instance be embodied as an electric, magnetic, electro-magnetic, optic or other storage medium, and may either be a removable medium or a medium that is fixedly installed in an apparatus or device. Non-limiting examples of such a computer-readable medium are a Random-Access Memory (RAM) or a Read-Only Memory (ROM). The computer-readable medium may for instance be a tangible medium, for instance a tangible storage medium. A computer-readable medium is understood to be readable by a computer, such as for instance a processor According to a fourth aspect of the invention, a computer program product is disclosed. The computer program product comprises a least one computer readable non-transitory memory medium having program code stored thereon, the program code which when executed by an apparatus causes the apparatus to classify samples of a set of samples of an image regarding whether or not a respective sample comprises optical information on a specific object type based on classification information. Therein the classification information comprises a plurality of classifiers, each classifier being associated exclusively with one colour channel of a plurality of colour channels.

According to a fifth aspect of the invention, a computer program product is disclosed, the computer program product comprising one ore more sequences of one or more instructions which, when executed by one or more processors, cause an apparatus at least to classify each sample of a set of samples of an image regarding whether or not a respective sample comprises optical information on a specific object type based on classification information. Therein, the classification information comprises a plurality of classifiers, each classifier being associated exclusively with one colour channel of a plurality of colour channels.

According to a sixth aspect of the invention, an apparatus is disclosed. The apparatus comprises means for performing the method according to the first aspect of the invention.

According to a seventh aspect of the invention, an apparatus is disclosed. The apparatus is configured to perform the method according to the first aspect of the invention.

According to an eighth aspect of the invention, an apparatus is disclosed, the apparatus comprising at least one processor and at least one memory including computer program code, said at least one memory and said computer program code configured to, with said at least one processor, cause said apparatus at least to perform the method according to the first aspect of the invention.

The computer program code included in the memory may for instance at least partially represent software and/or firmware for the processor. Non-limiting examples of the memory are a RAM or ROM that is accessible by the processor According to a ninth aspect of the invention, an apparatus is disclosed. The apparatus comprises means for classifying samples of a set of samples of an image regarding whether or not a respective sample comprises optical information on a specific object type based on classification information. Therein, the classification information comprises a plurality of classifiers, each classifier being associated exclusively with one colour channel of a plurality of colour channels.

The apparatuses according to the sixth, seventh, eighth and ninth aspect of the present invention may for instance be comprised in a mobile phone, a television set, a personal computer such as a stationary personal computer or a mobile personal computer, e.g. a laptop or a tablet computer, a portable music player or a gaming device to name just a few examples.

According to the present invention, due to each classifier of the plurality of classifiers being associated exclusively with one colour channel of a plurality of colour channels, each classifier may be applied to information derived from the samples of the set of samples of the image, wherein the derived information is specific to the respective associated colour channel. As a plurality of classifiers is comprised in the classification information, information from more than one colour channel may however still be considered. By means of this approach, correct classification of samples to a high degree, even of samples of a set of samples of an image acquired under difficult conditions, may be rendered possible. Moreover, due to each classifier of the plurality of classifiers being associated exclusively with one colour channel of a plurality of colour channels, determining each classifier may be simplified. In addition, the computational effort required to apply the classifier to the samples of a set of samples may be relatively low. This may enable on-line or real-time classification of the samples.

The image may in particular be a digital image. The image may in particular be a colour image. A colour image may be distinguished from a non-colour image (greyscale image) by the fact that samples of the colour image comprise colour information in more than one colour channel.

The set of samples of the image may comprise all samples of the image or only some of the samples of the image, for instance samples from at least one region of interest (ROI) within the image.

The samples of the set of samples may for instance be pixels. The samples may comprise colour information, in particular colour values in a plurality of colour channels.

In the context of the present invention, a classifier may be considered as a criterion used in deciding whether or not an image sample comprises optical information on a specific object type. Therein, a classifier may in particular be a colour based classifier, i.e. a classifier that requires only colour information of a sample for classifying the sample. The classifiers may be configured to classify image samples regarding whether or not a respective sample comprises optical information on the specific object type. The classifiers may be configured to classify a respective image sample based exclusively on colour information of the respective sample in the colour channel that the classifier is exclusively associated with.

The classification information may, in addition to the plurality of classifiers, comprise other information. To name just one example, the classification information may for instance comprise at least one threshold value that is associated with at least one classifier of the plurality of classifiers. Having classified a sample according to a classifier, the threshold value may for instance be employed to decide whether or not the sample comprises optical information on a specific object type. For instance, the sample may be considered to comprise optical information on the specific object type, if a value obtained by classifying a sample according to the respective classifier is higher than or equal to the threshold value. The sample may then be considered not to comprise optical information on the specific object type, if a value obtained by classifying the sample according to the classifier is lower than the threshold value.

Classifying samples of a set of samples of an image regarding whether or not a respective sample comprises optical information on a specific object type may serve for segmenting and/or detecting a concrete object of the specific object type in the image. As an arbitrarily chosen example, the specific object type may be a human hand type. The classifiers of the plurality of classifiers are designed to classify samples of the image that comprise optical information on a depicted human hand as comprising optical information on the depicted human hand. The classifiers of the plurality of classifiers are designed to classify other samples, e.g. samples that only comprise optical information on the image background, as not comprising optical information on the depicted hand. As an aside, the classifiers are of course likely not to work perfectly, so that samples may be misclassified. With classification being designed to classify image samples regarding whether or not a respective sample comprises optical information on a specific object type, i.e. as classification is not limited to a concrete object, the classification information and in particular the plurality of classifiers may be successfully employed for classifying samples of another hand, e.g. a hand of another person.

In the context of the present invention, each classifier being associated exclusively with one colour channel of a plurality of colour channels may comprise that each classifier is configured to classify a respective sample solely based on colour information of the respective sample in the colour channel that the classifier is exclusively associated with.

The colour channels of the plurality of colour channels may all be colour channels from the same colour space or they may be colour channels from different colour spaces. Some colour spaces the plurality of colour channels may be chosen from comprise the RGB colour space, the rgb colour space, the hsv colour space, the yuv colour space, the yiq colour space, etc. Exemplary colour channels may thus be the following colour channels from the above colour spaces: R, G, B, r, g, h, s, y, u, i and q. Each colour channel may be differently well suited for classifying image samples. In particular, a colour channel may differ from the other colour channels of the plurality of colour channels in how well samples comprising optical information on a specific object type may be distinguished from samples not comprising optical information on the specific object type in the respective colour channel.

For reasons of conciseness, in the following samples classified as comprising information on the specific object type will be referred to as object samples, while samples classified as samples not comprising information on the specific object type will be referred to as non-object samples.

For reasons of conciseness, in the following embodiments of the present invention are described mainly in the context of the method according to the first aspect of the invention. However, according to the present invention, embodiments of a computer program according to the second aspect of the invention, embodiments of a computer-readable medium according to the third aspect of the invention, embodiments of a computer program product according to the fourth or fifth aspect of the invention and embodiments of an apparatus according to the sixth, seventh, eighth or ninth aspect of the invention may exhibit corresponding features as the described embodiments of a method according to the first aspect. For these embodiments, what is described with respect to embodiments of a method according to the first aspect of the invention applies analogously.

According to an embodiment of a method according to the first aspect of the present invention, classifying samples of a set of samples is performed for a plurality of sets of samples of a plurality of images of an image sequence.

This embodiment may enable segmenting concrete objects of the specific object type in each image of the plurality of images.

In the context of this embodiment, classifying samples of a set of samples of an image of an image sequence may be performed sequentially for the images of the image sequence. Namely, classifying samples of a set of samples of an image of an image sequence may first be performed for the samples of a set of samples of a first image of the image sequence and then for the samples of a set of samples of a second image of the image sequence, etc. The image of which samples are currently classified may in this case be referred to as a 'current image'.

The images of the image sequence may have been acquired by means of a stereoscopic image acquisition device, e.g. a stereoscopic camera. In this case, the image sequence may comprise two images that assume the same temporal position in the image sequence.

According to an embodiment of a method according to the first aspect of the present invention, the method comprises tracking an object of the specific object type in the plurality of images of the image sequence.

Assuming that if any concrete object of the specific object type is present in an image of the image sequence it is the same concrete object of the specific object type throughout the images of the image sequence, the object may be tracked throughout the image sequence. Tracking the object may in particular comprise determining the position and/or posture of the object and observing how the position and/or posture of the object evolve throughout the image sequence.

According to an embodiment according to all aspects of the present invention, the specific object type is a body part type.

Samples of an image depicting an unclothed body part may be particularly well suited for being classified by means of colour based classifiers, i.e. classifiers that require only colour information of a sample for classifying the sample regarding whether or not the sample comprises optical information on the body part type. This is due to the fact that body parts are skin-coloured. Samples comprising skin-colour as colour information may be relatively easy to distinguish from other samples.

According to an embodiment according to all aspects of the present invention, the specific object type is a hand type.

Nowadays, hands are in many cases unclothed, i.e. no gloves are worn. This renders hands a suitable body part for classifying image samples of images depicting hands by means of colour based classifiers.

In the context of object tracking, this embodiment may render it possible to track a hand, i.e. an object of the hand type, throughout an image sequence. Hand tracking is an important basis for hand gesture tracking/recognition. Hand gesture tracking may be employed for user interfaces (UIs) of various devices such as mobile phones, television sets, personal computers such as stationary personal computers or mobile personal computers, e.g. laptops or tablet computers, portable music players or gaming devices to name just a few examples. Hand gesture based user interfaces may be very convenient for users since they tend to release users from tedious keyboard based inputs. Hand gesture based user interfaces may be operated intuitively.

Problems may occur with respect to gesture based user interfaces integrated in mobile devices. Mobile devices are generally constructed to be used by a user while moving, e.g. while walking around. With the user moving while images of an image sequence are acquired for hand gesture tracking, while a users hand may be likely present in each of the images of the image sequence, the remaining image content, i.e. image background, may change significantly throughout the images of the image sequence. For instance, at the moment of acquisition of one image of the image sequence the user may be located inside a building. The user may then leave the building and at the moment of acquisition of another image, the user may be located outside the building. The lighting conditions may in this case also change significantly.

As the present invention may provide elaborate classification information, namely highly sophisticated classifiers, it may enable correct classification of image samples and reliable hand gesture tracking even under adverse conditions, e.g. conditions often present in the field of hand gesture based user interfaces integrated in mobile devices.

According to an embodiment according to all aspects of the present invention, each classifier of the plurality of classifiers is associated with a different colour channel of the plurality of colour channels.

As each classifier of the plurality of classifiers is associated with a different colour channel of the plurality of colour channels, it is assured that classifying samples of a set of samples of an image takes into account information of different colour channels. It has been found out that there is not fixed best colour channel for classifying the samples regarding whether or not they comprise optical information on a specific object type. The best colour channel differs inter alia depending on the lighting conditions under which the image has been acquired and on the image background. Even if a classifier associated with a certain colour channel does not promise good classification alone, in conjunction with other classifiers, each of which is exclusively associated with a different colour channel of the plurality of colour channels, said classifier may contribute significantly to improved classification results. This is especially true for specific object types that are skin-coloured.

According to an embodiment of a method according to the first aspect of the present invention, the method comprises classifying a respective sample as comprising optical information on the specific object type only if the respective sample is classified as comprising optical information on the specific object type according to each classifier of the plurality of classifiers.

This embodiment may enable attaining a relatively low rate of image samples that are misclassified as object samples even though they actually do not comprise information on the specific object type (relatively low false positive rate).

According to an embodiment of a method according to the first aspect of the present invention, a sequence of the plurality of classifiers is defined and the method comprises, for a respective sample, going through the plurality of classifiers according to the sequence and classifying the respective sample according to the respective classifier.

The sequence of the plurality of classifiers as a whole may be referred to as a classification cascade tree. In this context, the classifiers of the plurality of classifiers may be referred to as nodes of the classification cascade tree.

This embodiment may enable establishing an advantageous sequence of the classifiers, which may contribute to efficient image sample classification.

For instance, an advantageous sequence of the classifiers may be established in the context of an embodiment that comprises classifying a respective sample as an object sample only if the respective sample is classified as an object sample according to each classifier of the plurality of classifiers. A sample of the set of samples of the image may then not be finally classified as an object sample based on the classification information if it is classified as a non-object sample according to only one classifier. Going through the plurality of classifiers may in this case terminate for the respective sample and the respective sample may be finally classified as a non-object sample. Thereby, the computational effort of classifying the respective sample according to the remaining classifiers of the plurality of classifiers may be saved.

Defining an advantageous sequence of the plurality of classifiers may comprise defining as a first classifier in the sequence of the plurality of classifiers a classifier that is expected to provide the lowest number of false positive classification results. Thus, a majority of samples not comprising optical information on the specific object type may be finally classified as such by classifying them only based on the first classifier in the sequence of the plurality of classifiers. The overall computational effort for image sample classification may thereby be kept low.

A definition of the sequence of the plurality of classifiers may form part of the classification information.

According to an embodiment according to all aspects of the present invention, at least one classifier of the plurality of classifiers is a Bayesian classifier.

This embodiment encompasses cases in which each classifier of the plurality of classifiers is a Bayesian classifier.

A Bayesian classifier, sometimes also referred to as Bayes classifier, may offer the advantage that it may be well suited for a classifier exclusively associated with one colour channel of a plurality of colour channels. This due to a Bayesian classifier assuming that whether or not a respective image sample comprises optical information on the specific object type may be decided based on colour information of the respective sample in only one colour channel and is unrelated to the colour information of the respective sample in other colour channels of the plurality of colour channels. While this may not be an actually valid assumption in most cases, good classification results may nevertheless be obtained.

For instance, let $colour_{s,i}$ denote the colour value of a sample s of a set of samples S of an image in colour channel i of a plurality of colour channels I. Further, let object denote the outcome that a sample s comprises optical information on the specific object type and let $\overline{object}$ denote the outcome that a sample s does not comprises optical information on the specific object type. A Bayesian classifier exclusively associated with colour channel i may then be denoted as $p_i(object|colour_{s,i})$ or $p_i(\overline{object}|colour_{s,i})$, respectively.

The classification information may comprise at least one threshold value T. The threshold value may be associated with the a specific classifier of the plurality of classifiers and thus be associated with a colour channel i. In this case the threshold value may be denoted $T_i$. For instance, the sample s may be considered to comprise optical information on the specific object type, if $$p_i(object|colour_{s,i}) \geq T_i.$$

Likewise, a sample s may be considered as a non-object sample if $$p_i(\overline{object}|colour_{s,i}) \geq T_i$$

It is noted that the above threshold values are merely exemplary and that in particular the threshold value for considering a sample an object sample and the threshold value for considering a sample a non-object sample may be different.

According to an embodiment of a method according to the first aspect of the present invention, the method comprises initially determining at least parts of the classification information.

Thereby, classification information required for classification at a later stage is provided.

Initially determining at least parts of the classification information may in particular comprise initially determining the classifiers of the plurality of classifiers.

According to an embodiment of a method according to the first aspect of the present invention, initially determining at least parts of the classification information comprises determining, in each colour channel of the plurality of colour channels:

a first training colour value probability distribution of a first set of training samples, wherein the samples of the first set of training samples have been classified as comprising optical information on the specific object type; and a second training colour value probability distribution of a second set of training samples, wherein the samples of the second set of training samples have been classified as not comprising optical information on the specific object type.

The first set of training samples and the second set of training samples may each have been classified manually by a human. This may be cumbersome but it may help to provide a high quality basis for classifier determination. The sets of training samples may be taken from one or from several images.

The cardinality of the first set of training samples and the cardinality of the second set of training samples may be the same so that an equal number of training samples classified as object samples and of training samples classified as non-object samples is provided.

In order to obtain the first training colour value probability distribution in a colour channel of the plurality of colour channels, the colour values of the training samples of the first set in the respective colour channel may be computed (if not already available, for instance due to the colour of the training samples being coded in a corresponding colour space).

Determining the first training colour value probability distribution may be performed separately in each colour channel of the plurality of colour channels. Determining the first training colour value probability distribution may be based on a one-dimensional (1D) colour histogram in the respective colour channel. Alternatively, determining the first training colour value probability distribution may be based on a multidimensional colour histogram, e.g. a 2D or 3D histogram, that may also be employed to determine the first training colour value probability distribution in at least one other colour channel. However, determining the first training colour value probability distribution based on a 1D histogram may be advantageous. Compared to determining the first training colour value probability distribution based on a multidimensional histogram, determining it based on a 1D histogram may be more robust against noise.

The above explications apply analogously to determining the second training colour value probability distribution.

A 1D colour histogram may be created in a respective colour channel by voting each training sample of the respective set of training samples to a histogram bin based on its colour value in the respective colour channel. By normalising the 1D colour histogram, the respective training colour value probability distribution in the respective colour channel may be obtained.

Using the notation introduced above, the first training colour value probability distribution may be written as $p_{training,i}(colour_i|object)$ and the second training colour value probability distribution may be written as $p_{training,i}(colour_i|\overline{object})$.

Based on the first training colour value probability distribution in a colour channel and the second training colour value probability distribution in the colour channel, a classifier associated exclusively with that colour channel may be determined. For instance, based on the Bayes' theorem, a Bayesian classifier $p(object|colour_{s,i})$ associated with colour channel i may be determined according to the following equation:

$$p_i(\text{object} \mid colour_{s,i}) = p_i(colour_{s,i} \mid \text{object}) \cdot \frac{p(\text{object})}{p(\text{object}) \cdot p_i(colour_{s,i} \mid \text{object}) + p(\overline{\text{object}}) \cdot p_i(colour_{s,i} \mid \overline{\text{object}})}$$

It may be assumed that $p(\overline{object})=p(object)$. This is due to the fact, that without any prior information available, the probability that a sample at any image location comprises optical information on the specific object type, i.e. that the sample is an object sample, is equal to the probability that a sample does not comprises optical information on the specific object type, i.e. that the sample is an non-object sample.

Consequently $$p_i(\text{object} \mid colour_{s,i}) = \frac{p_i(colour_{s,i} \mid \text{object})}{p_i(colour_{s,i} \mid \text{object}) + p_i(colour_{s,i} \mid \overline{\text{object}})}$$

applies.

According to an embodiment of a method according to the first aspect of the present invention, initially determining at least parts of the classification information comprises:
  calculating, in each colour channel of the plurality of colour channels, a value of a metric that is indicative of a separation of the first training colour value probability distribution and the second training colour value probability distribution in the respective colour channel;
  selecting as a highest separation colour channel of the plurality of colour channels the colour channel for which the value of the metric is indicative of the highest separation of the first training colour value probability distribution and the second training colour value probability distribution; and
  determining a classifier of the plurality of classifiers based on the first training colour value probability distribution and the second training colour value probability distribution in the highest separation colour channel, thereby associating the classifier with the highest separation colour channel.

This embodiment may enable determining a classifier that is associated with a highest separation colour channel according to the employed metric. It may be assumed that the highest separation colour channel is the most discriminative colour for the first set of training samples and the second set of training samples. Put differently, it may be assumed that among the colour channels of the plurality of colour channels the training samples of the first set and the training samples of the second set may be distinguished best in the highest separation colour channel.

The metric that is indicative of a separation of the first training colour value probability distribution and the second training colour value probability distribution may be based on the so-called Fisher Rule. Let $S_{t1}$ denote the first set of training samples and let $S_{t2}$ denote the second set of training samples. $|S_{t1}|$ then is the cardinality of $S_{t1}$ and $|S_{t2}|$ is the cardinality of $S_{t2}$. Further using the notation introduced above, based on the Fisher Rule the value $m_i$ of the metric in the respective colour channel i may be calculated according to the following equations:

$$m_i = \frac{(L_1 - L_2)^2}{R_1^2 + R_2^2}$$

$$L_1 = \frac{1}{|S_{t1}|} \sum_{s \in S_{t1}} colour_{s,i} \qquad L_2 = \frac{1}{|S_{t2}|} \sum_{s \in S_{t2}} colour_{s,i}$$

$$R_1 = \sum_{s \in S_{t1}} (colour_{s,i} - L_1)^2 \quad R_2 = \sum_{s \in S_{t2}} (colour_{s,i} - L_2)^2$$

According to an embodiment of a method according to the first aspect of the present invention, initially determining at least parts of the classification information comprises defining a sequence of the plurality of classifiers, wherein the classifier associated with the highest separation colour channel is enqueued in the sequence of the plurality of classifiers.

This embodiment may enable successively building the sequence of the plurality of classifiers by adding a recently determined classifier associated with the highest separation colour channel to it.

For instance, if in the course of determining the classification information only one classifier has been determined so far, i.e. if no other classifier has yet been determined so that the classifier associated with the highest separation colour channel is the only available classifier, by enqueueing the classifier associated with the highest separation colour channel in the sequence of the plurality of classifiers, the classifier associated with the highest separation colour channel becomes the first classifier in the sequence of the plurality of classifiers. However, if one classifier or more classifiers of the plurality of classifiers have already been determined previously, the most recently determined classifier becomes the so far last classifiers in the sequence.

Once each classifier of the plurality of classifiers has been determined and the sequence of the plurality of classifiers has been defined, for a respective sample going through the plurality of classifiers according to the sequence and classifying the respective sample according to the respective classifier may be carried out.

According to an embodiment of a method according to the first aspect of the present invention, initially determining at least parts of the classification information comprises:
classifying the training samples of the first set and the training samples of the second set based on available classification information;
discarding correctly classified training samples of the first set from the first set; and
discarding correctly classified training samples of the second set from the second set.

This embodiment may enable refining the data basis for determining further parts of the classification information, in particular further classifiers of the plurality of classifiers.

In the course of initially determining at least parts of the classification information, the classification information may not yet be complete at a given point in time. In particular, not every classifier of the plurality of classifiers may already be available. However, the classification information already available may be employed for classifying the training samples of the first set and the second set. Discarding correctly classified training samples of the first set from the first set and discarding correctly classified training samples of the second set from the second set may yield a reduction of training samples in the first set and in the second set.

Therein, correctly classified training samples of the first set are samples that have been classified as object samples, while correctly classified training samples of the second set are training samples that have been classified as non-object samples.

Having discarding correctly classified training samples of the first set from the first set and correctly classified training samples of the second set from the second set only misclassified training samples remain. This may be useful for determining a classifier that is tailored to improving classification results for training samples that have been misclassified based on the classification information available up to then in order to improve classification quality. As the number of training samples in the first set and in the second set has been reduced due to discarding training samples, determining such a tailored classifier may require less computational effort.

Discarding training samples form the first set or the second set may not have to correspond to permanently removing the training samples from the sets or even to deleting the sample data. It may be limited to not further considering the training samples in initially determining the classification information so that all training samples may remain available for future processing steps.

According to an embodiment of a method according to the first aspect of the present invention, initially determining at least parts of the classification information comprises repeatedly performing the steps of:
determining, in each colour channel of the plurality of colour channels, a first training colour value probability distribution of a first set of training samples, wherein the samples of the first set of training samples have been classified as comprising optical information on the specific object;
determining, in each colour channel of the plurality of colour channels, a second training colour value probability distribution of a second set of training samples, wherein the samples of the second set of training samples have been classified as not comprising optical information on the specific object type;
calculating, in each colour channel of the plurality of colour channels, a value of a metric that is indicative of a separation of the first training colour value probability distribution and the second training colour value probability distribution in the respective colour channel;
selecting as a highest separation colour channel the colour channel of the plurality of colour channels for which the value of the metric is indicative of the highest separation of the first training colour value probability distribution and the second training colour value probability distribution;
determining a classifier of the plurality of classifiers based on the first training colour value probability distribution and the second training colour value probability distribution in the highest separation colour channel, thereby associating the classifier with the highest separation colour channel;
enqueueing the classifier associated with the highest separation colour channel in the sequence of the plurality of classifiers;
classifying the training samples of the first set and the training samples of the second set based on available classification information;
discarding correctly classified training samples of the first set from the first set; and
discarding correctly classified training samples of the second set from the second set.

For simplified reference, the above steps will be called 'initialisation steps' in the following.

According to this embodiment, the plurality of classifiers may be created successively and at the same time the sequence of the plurality of classifiers may be defined by enqueueing each classifier in the sequence. Each classifier that is enqueued in the sequence of the plurality of classifiers is associated with a highest separation colour channel for the first training colour value probability distribution and the second training colour value probability distribution, wherein these probability distributions are determined based on the current first set and the current second set of training samples that have been misclassified in a previous classification step. Consequently, classifiers tailored to classify previously misclassified training samples may be obtained.

According to an embodiment of a method according to the first aspect of the present invention, the initialisation steps are repeatedly performed until the sum of the cardinality of the first set and the cardinality of the second set falls below a specific threshold. For instance, let $t_{card}$ denote the specific threshold. Further using the notation introduced above, repeating the initialisation steps may then terminate if $$|S_{t1}|+|S_{t2}|<t_{card}$$

For determining the cardinality of the first set and the cardinality of the second set, discarded training samples are not consider elements of these sets.

When performing the initialisation steps terminates, a classification cascade tree well suited to reliably classify the training samples of the first set and the second set may have been obtained.

Each time the initialisation steps have been performed, the colour channel that has most recently been identified as highest separation colour channel may be removed from the plurality of colour channels in which the first training colour value probability distribution and the second training colour value probability distribution are calculated when the initialisation steps are carried out again at a later stage. Thereby, it is attained that each classifier of the plurality of classifiers is associated with a different colour channel of the plurality of colour channels.

According to an embodiment of a method according to the first aspect of the present invention, the method comprises updating at least parts of the classification information.

Updated classification information may contribute to enabling obtaining good classification results even if conditions have changed, e.g. if the lighting conditions in the image differ significantly from the lighting conditions in, for instance, a training image from which training samples have been taken for initially determining the classification information or the image background has changed significantly. According to the embodiment presently discussed, not a single set of classification information is permanently employed but adaptive classification information is used so as to have at hand classification information well adapted to varying imaging conditions. Put differently, a learning classification algorithm is provided.

In particular, updating the classification information may comprise updating the plurality of classifiers and/or a sequence of classifiers. Updating at least parts of the classification information may comprise updating the classification information for a subsequent classification procedure. For instance, the updated classification information may be used to classify samples of another image, e.g. a subsequent image of an image sequence, regarding whether or not a respective sample comprises optical information on the specific object type based on the updated classification information.

Updating at least parts of the classification information may for instance be performed after the samples of the set of samples of a current image have been classified in order to provide updated classification information for classifying image samples of another image, e.g. a subsequent image of an image sequence.

According to an embodiment of a method according to the first aspect of the present invention, updating at least parts of the classification information comprises determining, in each colour channel of the plurality of colour channels:
- an updated first colour value probability distribution of samples classified as comprising optical information on the specific object type; and
- an updated second colour value probability distribution of samples classified as not comprising optical information on the specific object type.

Therein, the samples classified as comprising optical information on the specific object type may have origin in different images. The same holds for the samples classified as not comprising optical information on the specific object type. For instance, if updating at least parts of the classification information is performed for the first time, the samples may encompass training samples provided for initially determining at least parts of the classification information and taken from, for instance, a training image and they may encompass samples of the set of samples of the image which have been classified most recently.

According to an embodiment of a method according to the first aspect of the present invention,
- each updated first colour value probability distribution is based on a weighted sum of a first current colour value probability distribution in the respective colour channel and of a first previous colour value probability distribution in the respective colour channel; and
- each updated second colour value probability distribution is based on a weighted sum of a second current colour value probability distribution in the respective colour channel and of a second previous colour value probability distribution in the respective colour channel.

This embodiment may enable fusing current colour value probability distributions and previous colour value probability distributions for updating classification information. Consequently, updated classification information has a basis in previous colour value probability distributions but evolves based on current colour value probability distributions. The classification information may thus evolve, thereby adapting to new conditions so that good classification results may still be obtained under these new conditions, e.g. new lighting conditions or new image background conditions.

In the context of this embodiment, the first current colour value probability distribution may be based on samples of the set of samples of the (current) image, wherein said samples have been classified as object samples. Likewise, the second current colour value probability distribution may be based on samples of the set of samples of the (current) image, wherein said samples have been classified as non-object samples. The first previous colour value probability distribution in the respective colour channel may be based on samples taken from at least one previous image, e.g. training samples of the first set. Likewise, the second previous colour value probability distribution in the respective colour channel may be based on samples taken from at least one previous image, e.g. training samples of the second set.

Using the notation introduced above, the first updated colour value probability distribution may be calculated according to the equation $$p_{u,i}(\text{colour}_i|\text{object}) = p_{p,i}(\text{colour}_i|\text{object}) + \lambda_{1,i} p_{c,i}(\text{colour}_i|\text{object}).$$

Likewise, the second updated colour value probability distribution may be calculated according to the equation $$p_{u,i}(\text{colour}_i|\overline{\text{object}}) = p_{p,i}(\text{colour}_i|\overline{\text{object}}) + \lambda_{2,i} p_{c,i}(\text{colour}_i|\overline{\text{object}}).$$

Therein, the indices u, p and c denote an updated probability distribution, a previous probability distribution, and a current probability distribution, respectively. $\lambda_{1,i}$ and $\lambda_{2,i}$ each denote a weight for weighting the respective previous probability distribution in the respective colour channel i.

$\lambda_{i,1}$ and $\lambda_{2,i}$ both be smaller than 1 so that a current colour value probability distribution has less impact on the updated colour value probability distribution than the previous colour value probability distribution. This may turn out especially beneficial if the previous colour value probability distribution has been determined on a significantly larger number of samples than the current colour value probability distribution. $\lambda_{1,i}$ and $\lambda_{2,i}$ may be the same in each of the plurality of colour channels. In this case, they may also be written without the index i. For each colour channel of the plurality of colour channels $\lambda_{1,i} = \lambda_{2,i}$ apply.

According to an embodiment of a method according to the first aspect of the present invention, updating at least parts of the classification information comprises:
- calculating, in each colour channel of the plurality of colour channels, a value of a metric that is indicative of a separation of the first updated colour value probability distribution and the second updated colour value probability distribution in the respective colour channel;
- selecting as a highest separation colour channel of the plurality of colour channels the colour channel for which the value of the metric is indicative of the highest separation of the first updated colour value probability distribution and the second updated colour value probability distribution; and determining an updated classifier based on the first updated colour value probability distribution and the second updated colour value probability distribution in the highest separation colour channel, thereby associating the updated classifier with the highest separation colour channel.

Similar features have already been discussed with regard to initially determining at least parts of the classification information. In the embodiment presently discussed, they may likewise enable determining an updated classifier that is associated with a highest separation colour channel according to the value of the metric. It may be assumed that the highest separation colour channel is the most discriminative colour channel for the first updated colour value probability distribution and the second updated colour value probability distribution.

The metric that is indicative of a separation of the first updated colour value probability distribution and the second updated colour value probability distribution may again be based on the Fisher Rule.

Let $S_i$ denote a set of samples consisting of all the samples considered for determining the updated first colour value probability distribution, i.e. the samples classified as object samples based on which the first current colour value probability distribution has been determined and the samples classified as object samples based on which the first previous colour value probability distribution has been determined. Likewise, Let $S_2$ denote a set of samples consisting of all the samples considered for determining the updated second colour value probability distribution, i.e. the samples classified as non-object samples based on which the second current colour value probability distribution has been determined and the samples classified as non-object samples based on which the second previous colour value probability distribution has been determined.

The value $m_i$ of the metric in the respective colour channel i may be calculated according to the following equations:

$$m_i = \frac{(L_1 - L_2)^2}{R_1^2 + R_2^2}$$

$$L_1 = \frac{1}{|S_{t1}|} \sum_{s \in S_{t1}} colour_{s,i} \qquad L_2 = \frac{1}{|S_{t2}|} \sum_{s \in S_{t2}} colour_{s,i}$$

$$R_1 = \sum_{s \in S_{t1}} (colour_{s,i} - L_1)^2 \qquad R_2 = \sum_{s \in S_{t2}} (colour_{s,i} - L_2)^2$$

According to an embodiment of a method according to the first aspect of the present invention, updating at least parts of the classification information comprises defining an updated sequence of the plurality of classifiers, wherein the updated classifier associated with the highest separation colour channel is enqueued in the updated sequence of the plurality of classifiers.

This embodiment may enable successively updating the sequence of the plurality of classifiers by adding a recently updated classifier associated with the highest separation colour channel to the updated sequence of the plurality of classifiers.

For instance, if in the course of updating the classification information only one updated classifier may have been determined so far. No other updated classifier has in this case been updated so that the updated classifier associated with the highest separation colour channel is the only available updated classifier. By enqueueing the updated classifier associated with the highest separation colour channel in the updated sequence of the plurality of classifiers, the updated classifier associated with the highest separation colour channel becomes the first updated classifier in the updated sequence of the plurality of classifiers. However, if one updated classifier or more updated classifiers have already been determined previously, the most recently updated classifier associated with the highest separation colour channel becomes the so far last updated classifiers in the updated sequence of the plurality of classifiers.

Once in the course of updating at least parts of the classification information each updated classifier has been determined and the updated sequence of the plurality of classifiers has been established, the updated sequence of the plurality of classifiers may be employed in a subsequent classification procedure. For instance image samples of a subsequent image of an image sequence may be classified by going through the plurality of updated classifiers according to the updated sequence and classifying a respective sample according to the respective updated classifier may be carried out.

The first updated classifier in the sequence of updated classifiers may be associated with a different colour channel compared to the first classifier in a previous sequence of the plurality of classifiers. The same applies for the other updated classifiers of the plurality of classifiers. Considering the sequence of the plurality of classifiers as a classification cascade tree and considering the classifiers as nodes of the classification cascade tree, one may thus say that the order of the nodes may change, i.e. that the classification tree may evolve spatially.

According to an embodiment of a method according to the first aspect of the present invention, updating at least parts of the classification information comprises:

classifying the samples of the set of samples of the image based on available updated classification information; and discarding correctly classified samples of the set of samples from the set of samples.

This embodiment may enable refining the data basis for determining further updated parts of the classification information, in particular further updated classifiers.

In the course of updating at least parts of the classification information, the updated classification information may not yet be complete at a given point in time. In particular, not every classifier of the plurality of classifiers may have already been updated.

However, the updated classification information available at that point in time may be employed for classifying the samples of the set of samples of the image.

Discarding correctly classified samples of the set of samples from the set of samples yields a reduction of the number of samples in the set of samples.

Whether or not a respective sample has been classified correctly may be judged by comparing the result of classifying said sample according to the available updated classification information to the result of classifying said sample according to the classification information before the update. A sample may be considered to have been classified correctly if both classification results are identical. For instance, a sample may be considered to have been classified correctly if it has been classified as an object sample according to the available updated classification information and according to the classification information before the update. Classification results obtained based on classification information that has not yet been updated may be available for comparison. For example, they may be available due to updating at least parts of the classification information being performed to have updated classification information at hand for classifying image samples of a subsequent image of an image sequence, while the samples of a current image of the image sequence have already been classified and classification results are thus provided.

Having discarding correctly classified samples of the set of samples from the set of samples, only misclassified samples remain. This may be useful for determining an updated classifier that is tailored to improving classification results for samples that have been misclassified based on the so far available updated classification information. As the number of samples in the set of samples has been reduced, determining such an updated classifier may require less computational effort.

According to an embodiment of a method according to the first aspect of the present invention, updating at least parts of the classification information comprises repeatedly performing:
- determining, in each colour channel of the plurality of colour channels, an updated first colour value probability distribution of samples classified as comprising optical information on the specific object type; and an updated second colour value probability distribution of samples classified as not comprising optical information on the specific object type, wherein
  - each updated first colour value probability distribution is based on a weighted sum of a first current colour value probability distribution in the respective the colour channel and of a first previous colour value probability distribution in the respective colour channel; and
  - each updated second colour value probability distribution is based on a weighted sum of a second current colour value probability distribution in the respective colour channel and of a second previous colour value probability distribution in the respective colour channel;
- calculating, in each colour channel of the plurality of colour channels, a value of a metric that is indicative of a separation of the first updated colour value probability distribution and the second updated colour value probability distribution in the respective colour channel;
- selecting as a highest separation colour channel of the plurality of colour channels the colour channel for which the value of the metric is indicative of the highest separation of the first updated colour value probability distribution and the second updated colour value probability distribution;
- determining an updated classifier based on the first updated colour value probability distribution and the second updated colour value probability distribution in the highest separation colour channel, thereby associating the updated classifier with the highest separation colour channel;
- defining an updated sequence of the plurality of classifiers, wherein the updated classifier associated with the highest separation colour channel is enqueued in the updated sequence of the plurality of classifiers;
- classifying the samples of the set of samples of the image based on available updated classification information; and
- discarding correctly classified samples of the set of samples from the set of samples.

For simplified reference, the above steps will be called 'updating steps' in the following.

This embodiment may enable successively determining updated classifiers and at the same time establishing the updated sequence of the plurality of classifiers by enqueueing each updated classifier in the updated sequence.

By discarding correctly classified samples of the set of samples from the set of samples, only previously misclassified samples remain when the next updated classifier is determined. Thus, an updated classifier tailored to improving classification results for misclassified samples may be determined.

The updated classifier that is enqueued in the updated sequence is associated with the highest separation colour channel for the first updated colour value probability distribution and the second updated colour value probability distribution. These updated probability distributions are a fusion of current colour value probability distributions and previous colour value probability distributions. Consequently, each updated classifier has a basis in previous colour value probability distributions but evolves based on current colour value probability distributions.

In the context of this embodiment, the first and second current colour value probability distributions may be based on samples of the set of samples, wherein some samples may have already been discarded from the original set of samples after having previously determined another updated classifier. For instance, the first and second previous colour value probability distributions may be colour value probability distributions that have been determined as first and second updated colour value probability distributions in a previous loop over the updating steps. Alternatively, they may be first and second training colour value probability distributions.

According to an embodiment of a method according to the first aspect of the present invention, the updating steps are repeatedly performed until the cardinality of set of samples falls below a specific threshold. For determining the cardinality of the set of samples, samples discarded from the set of samples are not considered elements of the set of samples.

According to another embodiment of a method according to the first aspect of the present invention, the updating steps are repeatedly performed until each classifier of the plurality of classifiers has been updated.

When performing the updating steps terminates, an updated classification cascade tree well suited to reliably classify samples of a subsequent image may have been obtained.

Each time the updating steps have been performed, the colour channel that has most recently been identified as highest separation colour channel may be removed from the plurality of colour channels in which the first updated colour value probability distribution and the second updated colour value probability distribution are calculated when the updating steps are carried out again at a later stage. Thereby, it is attained that each updated classifier is associated with a different colour channel of the plurality of colour channels.

For the second to ninth aspects of the present invention, the above description of the first aspect of the present invention and of its embodiments equally applies. In particular, all features and advantages of the first aspect of the present invention (including its embodiments) shall be understood to be disclosed in connection with the second to ninth aspect of the present invention as well.

It is to be noted that the above-described embodiments of the present invention are to be understood as non-limiting examples only.

Furthermore, the embodiments described above and in particular their single features shall be understood to be disclosed in all possible combinations with each other.

These and further concepts of the invention will be apparent from and elucidated with reference to the detailed description presented hereinafter.

DETAILED DESCRIPTION OF EMBODIMENTS OF THE INVENTION

Figure 1:
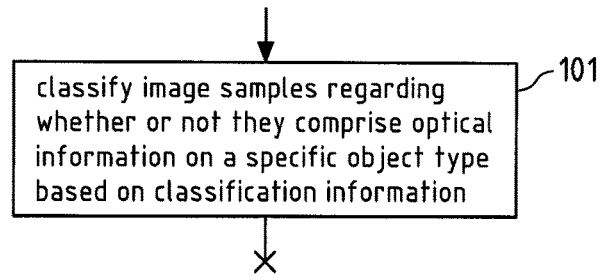
FIG. 1: a flowchart schematically illustrating a first embodiment of a method according to the first aspect of the present invention.

FIG. 1 shows a flowchart schematically illustrating a first embodiment of a method according to the first aspect of the present invention.

In step 101 classifying samples of a set of samples of an image regarding whether or not a respective sample comprises optical information on a specific object type based on classification information is performed. Therein, the classification information comprises a plurality of classifiers, each classifier being associated exclusively with one colour channel of a plurality of colour channels.

Figure 2:
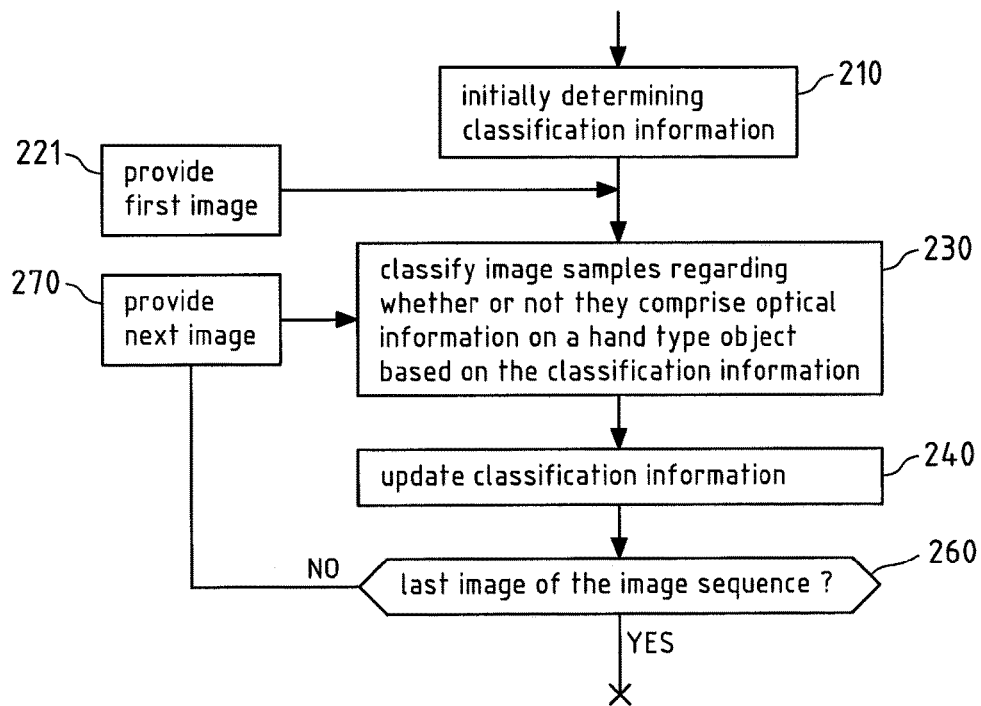
FIG. 2: a flowchart schematically illustrating a second embodiment of a method according to the first aspect of the present invention.

FIG. 2 shows a flowchart schematically illustrating a second embodiment of a method according to the first aspect of the present invention.

The method of this flowchart is employed in the context of tracking a human hand, i.e. a hand type object, throughout a plurality of images of an image sequence for hand gesture tracking. The method may be performed by a mobile device in so as to enable user interactions with the mobile device.

In step 210, classification information is initially determined. The classification information comprises a plurality of classifiers, each classifier being associated exclusively with one colour channel of a plurality of colour channels.

In step 221, a first image of the image sequence is provided for performing image sample classification on it. As this image is the image that is currently processed, said image may be referred to as the 'current image'.

For the first image, classifying samples of a set of samples of the first image regarding whether or not a respective sample comprises optical information on a hand type object based on the classification information initially determined in step 210 is performed in step 230.

Thereafter, the classification information is updated in step 240. Subsequently, it is checked in step 240 whether or not the current image, i.e. in this case the first image, is the last image of the plurality of images of the image sequence. If this is case, the control flow ends. However, if there is at least one subsequent image remaining in the image sequence, said image is fetched and provided for classification in step 270. Steps 230, 240, 260 and 270 are repeated until it is found in step 260 the last image of the plurality of images of the image sequence has been reached.

Figure 3:
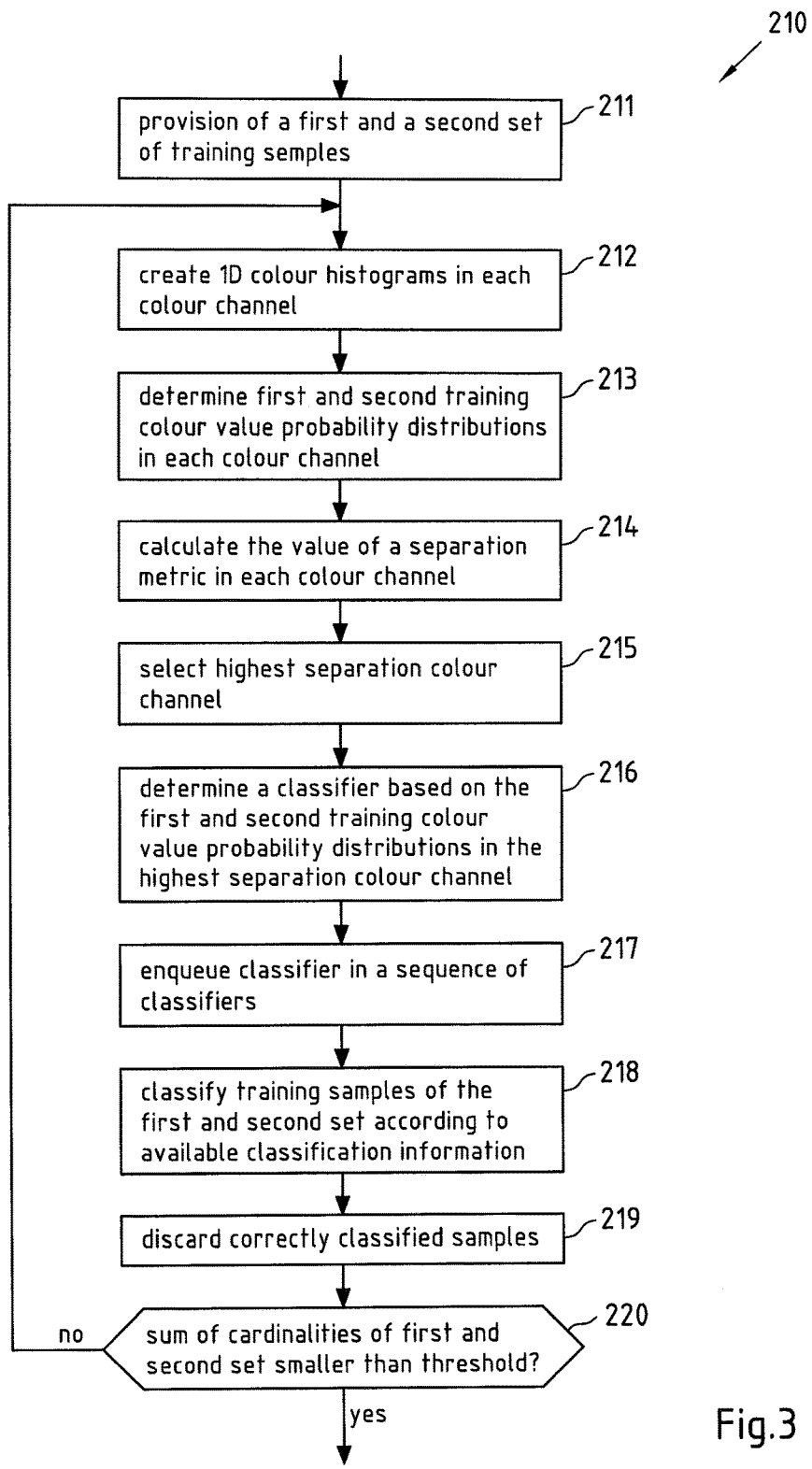
FIG. 3: a flowchart schematically illustrating initially determining classification information in the context of the second embodiment of a method according to the first aspect of the present invention.

FIG. 3 shows a flowchart schematically illustrating initially determining classification information in the context of the second embodiment of a method according to the first aspect of the present invention, i.e. FIG. 3 shows in more detail the steps performed in the course of performing step 210 of the flowchart of FIG. 2.

Initially, training samples are provided in step 211. The training samples comprise colour information, i.e. colour values in a plurality of colour channels. The training samples are taken from several training images. The training samples are pixels of the training images. Each of the training images shows at least parts of a human hand. The training images have been acquired under different lighting conditions. Apart from human hands, the training images contain image background. The image background varies among the training images.

The training samples have been classified manually by a human regarding whether or not they comprise optical information on a human hand. The training samples are distributed to a first set of training samples $S_{t1}$ and to a second set of training samples $S_{t2}$. The training samples that have been classified as comprising optical information on a human hand are allotted to the first set of training samples $S_{t1}$ and the training samples that have been classified as not comprising optical information on a human hand have been allotted to the second set of training samples $S_{t2}$.

For reasons of conciseness, in the following samples/training samples classified as comprising optical information on a human hand will be referred to as hand samples, while samples classified as not comprising optical information on a human hand will be referred to as non-hand samples. Manual classification of the training samples has been performed based on the colour of the training samples. Therein, skin-coloured samples have been classified as hand samples, while samples that are not skin-coloured have been classified as non-hand samples. Thus, it may also be spoken of skin and non-skin samples. It is however adhered to the terms hand samples and non-hand samples.

The cardinality of the first set of training samples $S_{t1}$ and the cardinality of the second set of training samples $S_{t2}$ are the same. Thus, an equal number of hand samples and non-hand samples is provided.

In the context of the presently discussed embodiment of a method according to the first aspect of the present invention, a plurality of colour channels I chosen from a plurality of colour spaces is considered. Namely, the colour channels i from the RGB colour space, the rgb colour space, the hsv colour space, the yuv colour space and the yiq colour space are considered. The plurality of colour channels I thus consists in this case of the colour channels R, G, B, r, g, h, s, y, u, i and q.

Each colour channel is differently well suited for classifying a respective sample. In particular, a colour channel may differ from the other colour channels of the plurality of colour channels in how well samples comprising optical information on a human hand may be distinguished from samples not comprising optical information on a human hand in the respective colour channel.

In step 212, one-dimensional colour histograms are created in each colour channel i of the plurality of colour channels I based on the training samples of the first set $S_{t1}$ and one-dimensional colour histograms are created in each colour channel i based on the training samples of the second set of $S_{t2}$. When, for instance, a 1D colour histogram is to be created in colour channel R and the colour information of the training samples is not coded in the RGB colour space, the colour values in colour channel R are computed by means of colour space transmission. In step 212, creating the 1D colour histograms involves voting each training sample of the respective set of training samples to a histogram bin based on its colour value in the respective colour channel i.

In step 213, the first training colour value probability distributions $p_{training,i}(colour_i|hand)$ and the second training colour value probability distributions $p_{training,i}(colour_i|\overline{hand})$ are determined in each colour channel i. To this end the 1D colour histograms computed in step 212 are normalised. The first and second training colour value probability distributions are then estimated based on the respective normalised 1D colour histograms. Compared to determining the training colour value probability distributions based on a multidimensional histogram, determining the training colour value probability distributions based on a respective 1D histogram is more robust against noise.

Step 214 comprises calculating, in each colour channel i of the plurality of colour channels I, a value $m_i$ of a metric that is indicative of the first training colour value probability distribution $p_{training,i}(colour_i|hand)$ and the second training colour value probability distribution $p_{training,i}(colour_i|\overline{hand})$ in the respective colour channel i. The metric is based on the so-called Fisher Rule. The value $m_i$ of the metric is calculated according to the equations:

$$m_i = \frac{(L_1 - L_2)^2}{R_1^2 + R_2^2}$$

$$L_1 = \frac{1}{|S_{t1}|} \sum_{s \in S_{t1}} colour_{s,i} \qquad L_2 = \frac{1}{|S_{t2}|} \sum_{s \in S_{t2}} colour_{s,i}$$

$$R_1 = \sum_{s \in S_{t1}} (colour_{s,i} - L_1)^2 \qquad R_2 = \sum_{s \in S_{t2}} (colour_{s,i} - L_2)^2$$

Step 215 comprises selecting as a highest separation colour channel the colour channel i for which the value $m_i$ of the metric is indicative of the highest separation of the first training colour value probability distribution $p_{training,i}(colour_i|hand)$ and the second training colour value probability distribution $p_{training,i}(colour_i|\overline{hand})$. It may be assumed that the highest separation colour channel sep is the most discriminative colour channel for the first set of training samples $S_{t1}$ and the second set of training samples $S_{t2}$. Put differently, it may be assumed that among the colour channels of the plurality of colour channels I, the training samples of the first set $S_{t1}$ and the training samples of the second set $S_{t2}$ may be distinguished best in the highest separation colour channel sep.

Step 216 comprises determining a classifier based on the first training colour value probability distribution $p_{training,sep}(colour_{sep}|hand)$ and the second training colour value probability distribution $p_{training,sep}(colour_{sep}|\overline{hand})$ in the highest separation colour channel sep. The classifier is thus associated with the highest separation colour channel sep.

In the present embodiment, the classifier is a Bayesian classifier.

Let $colour_{s,sep}$ denote the colour value of a sample s of a set of samples S of an image in colour channel sep. A Bayesian classifier exclusively associated with colour channel sep may then be denoted as $p_{sep}(hand|colour_{s,sep})$. According to Bayes' theorem the Bayesian classifier $p_{sep}(hand|colour_{s,sep})$ may be determined according to the following equation:

$$p_{sep}(hand \mid colour_{s,sep}) = p_{sep}(colour_{s,sep} \mid hand) \cdot \frac{p(hand)}{p(hand) \cdot p_{sep}(colour_{s,sep} \mid hand) + p(\overline{hand}) \cdot p_{sep}(colour_{s,sep} \mid \overline{hand})}$$

It may be assumed that $p(hand)=p(\overline{hand})$. This is due to the fact, that without any prior information available, the probability that a sample at any image location comprises optical information on a human hand, i.e. that the sample is a hand sample, is equal to the probability that a sample does not comprises optical information on a human hand, i.e. that the sample is an non-hand sample. The Bayesian classifier $p_{sep}(hand|colour_{s,sep})$ may then be determined based on the equation:

$$p_{sep}(hand \mid colour_{s,sep}) = \frac{p_{sep}(colour_{s,sep} \mid hand)}{p_{sep}(colour_{s,sep} \mid hand) + p_{sep}(colour_{s,sep} \mid \overline{hand})}$$

The Bayesian classifier $p_{sep}(hand|colour_{s,sep})$ may be calculated accordingly.

The Bayesian classifier $p_{sep}(hand|colour_{s,sep})$ assumes that whether or not an image sample s comprises optical information on a human hand may be decided based on colour information of the respective sample s only in colour channel sep and is unrelated to the colour information of the sample s in other colour channels i of the plurality of colour channels I. While this may not be an actually valid assumption in most cases, good classification results may nevertheless be obtained. As the Bayesian classifier $p_{sep}(hand|colour_{s,sep})$ is configured to classify a sample s solely based on colour information of the sample s in the colour channel sep, the Bayesian classifier $p_{sep}(hand|colour_{s,sep})$ is exclusively associated with colour channel sep.

Step 217 comprises that the classifier determined in step 216 is enqueued in a sequence of classifiers. As initially only one classifier has been determined so far, by enqueueing that classifier in the sequence it becomes the first classifier in the sequence. The sequence constitutes classification information.

In step 218 the training samples of the first set of training samples $S_{t1}$ and the second set of training samples $S_{t2}$ are classified based on available classification information. To this end, a threshold value T is provided. A sample s is classified as a hand sample if $$p_{sep}(\text{hand}|\text{colour}_{s,sep}) \geq T.$$

Otherwise, the sample s is classified as a non-hand sample.

Alternatively, a sample s may be considered as a non-hand sample if $$p_{sep}(\overline{\text{hand}}|\text{colour}_{s,sep}) \geq T.$$

Otherwise, the sample s may be classified as a hand sample.

It is noted that the above threshold values are merely exemplary and that in particular the threshold value for considering a sample a hand sample and the threshold value for considering a sample a non-hand sample may be different.

A sample s of the first set $S_{t1}$ is considered to have been classified correctly if it has been classified a hand sample. A sample s of the second set $S_{t2}$ is considered to have been classified correctly if it has been classified as a non-hand sample.

In step 219, correctly classified samples s of the first set $S_{t1}$ are discarded from the set $S_{t1}$. Correctly classified samples s of the second set $S_{t2}$ are discarded from the set $S_{t2}$. The cardinality of the first set $S_{t1}$ and the cardinality of the second set $S_{t2}$ are thus reduced.

Step 220 comprises checking whether or not the sum of the cardinality of the first set of training samples $S_{t1}$ and the cardinality of the second set of training samples $S_{t2}$ falls below a specific threshold $t_{card}$. If $$|S_{t1}|+|S_{t2}|<t_{card}$$

applies, initially determining at least parts of the classification is finished and it is continued with performing step 221 and then step 230 of the flowchart depicted in FIG. 2. If not, it is returned to step 212. The initialisation steps 212 to 220 are thus performed repeatedly. Therein, samples discarded from the first set of training samples $S_{t1}$ or discarded from the second set of training samples $S_{t2}$ are not considered anymore. Furthermore, the colour channel identified as the highest separation colour channel in step 215 is not considered anymore. This reduces computational effort and makes sure that each time step 216 is performed the newly determined classifier is associated with a different colour channel.

Having discarded correctly classified training samples, only training samples misclassified in step 218 remain in $S_{t1}$ and in $S_{t2}$. Thus, the data basis for determining further parts of the classification information, in particular further classifiers, has been refined. When 1D colour histograms are once again created based on the training samples of the first set $S_{t1}$ and the training samples of the second set $S_{t2}$, less computational effort is required due to the reduced number of samples that have to be considered.

The first and second training colour value probability distributions $p_{training,i}(\text{colour}_i|\text{hand})$ and $p_{training,i}(\text{colour}_i|\overline{\text{hand}})$ then represent only the colour value distribution of the training samples misclassified in step 218. The highest separation colour channel subsequently determined and selected in steps 214 and 215 is therefore the colour channel for which it is assumed that the colour value probability distributions of the misclassified samples may be distinguished best in this colour channel. Hence, in step 216 a classifier tailored to classifying the previously misclassified training samples is determined.

By enqueueing the newly determined classifier in the sequence of classifiers in step 217, the newly determined classifier becomes the next classifier in the sequence of classifiers. The sequence as a whole may be referred to as a classification cascade tree Q. In this context, the classifiers of the plurality of classifiers may be referred to as nodes $Q_1$, $Q_2, \ldots, Q_n$ of the classification cascade tree.

Each time step 218 is performed, for each of the training samples of the first set of training samples $S_{t1}$ and for each of the training samples of the second set of training samples $S_{t2}$, going through the plurality of classifiers so far determined according to the sequence and classifying the respective sample is carried out. According to the embodiment presently discussed, a sample s is classified as a hand sample only if the sample is classified as a hand sample according to each classifier so far determined. Going through the classifiers of the sequence of classifiers therefore terminates for the respective sample if it has been classified as a non-hand sample according to only one classifier. Thereby, the computational effort for classifying the respective sample according to the remaining classifiers of the plurality of classifiers is saved.

When performing the initialisation steps 212 to 220 terminates due to the number of samples in the first set of training samples $S_{t1}$ and in the second set of training samples $S_{t2}$ having dropped below the threshold $t_{card}$ a classification cascade tree well suited to reliably classify the training samples s of the original first set of training samples and the original second set of training samples has been obtained.

Figure 4A:
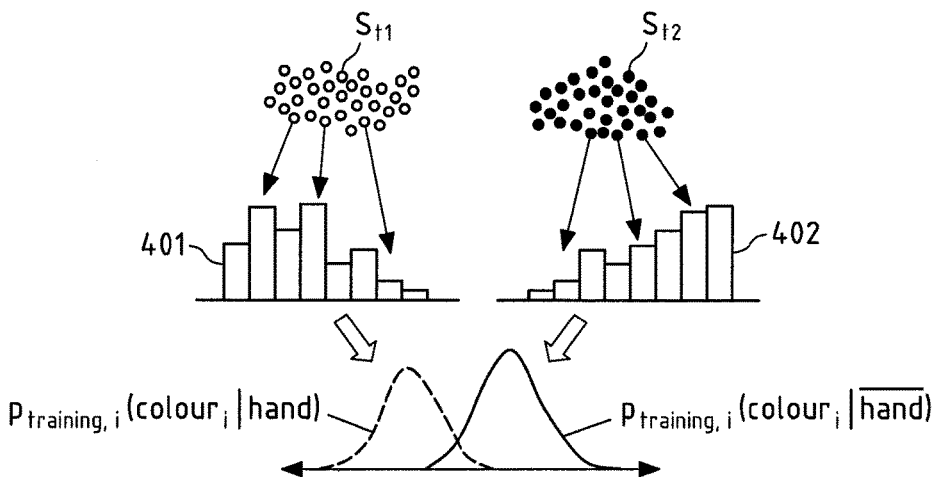
FIG. 4a: a graphic illustration schematically illustrating the first three steps of the flowchart of FIG. 3.

FIG. 4a shows a graphic illustration schematically illustrating the steps 211 to 213 of the flowchart of FIG. 3.

As shown in FIG. 4a, the first set of training samples $S_{t1}$ and the second set of training samples $S_{t2}$ comprise an equal number of training samples. The training samples of the first set $S_{t1}$ have been manually classified as hand samples. The training samples of the second set $S_{t2}$ have been manually classified as non-hand samples. From the first set of samples $S_{t1}$ the 1D colour histogram 401 is created in a colour channel i, while from the second set of training samples $S_{t2}$ the 1D colour histogram 402 is created in colour channel i. The first training colour value probability distribution $p_{training,i}(\text{colour}_i|\text{hand})$ in colour channel i is then determined based on 1D colour histogram 401. Likewise, the second training colour value probability distribution $p_{training,i}(\text{colour}_i|\overline{\text{hand}})$ in colour channel i is determined based on 1D colour histogram 402. The above steps are carried out for each colour channel i of the plurality of colour channels I.

Figure 4B:
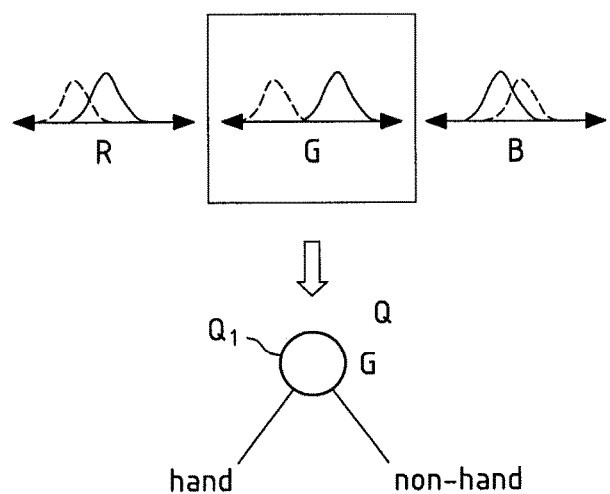
FIG. 4b: a graphic illustration schematically illustrating the next four steps of the flowchart of FIG. 3.

FIG. 4b shows a graphic illustration schematically illustrating steps 214 to 217 of the flowchart of FIG. 3.

In an upper part of FIG. 4b, previously determined first and second colour value probability distributions in three colour channels are shown. Therein, the first and second colour value probability distributions in the same colour channel are grouped together. In FIG. 4b, first and second colour value probability distributions are shown for the colour channels R, G and B. This is just a random selection and it is noted that according to the present invention other colour channels and more colour channels may be considered. The colour channels may be colour channels from different colour spaces. However, for simplified illustration, only the three colour channels of the RGB colour space are referred to in the following.

In each colour channel i, the value of a metric indicative of a separation of the first and second colour value probability distributions in the respective colour channel is calculated. Thereafter, a highest separation colour channel is selected. In the present example, the G channel is the highest separation colour channel. This is indicated by the frame drawn around the first and second colour value probability distributions $p_{training,G}(colour_G|hand)$ and $p_{training,G}(colour_G|\overline{hand})$ in colour channel G. Based on $p_{training,G}(colour_G|hand)$ and $p_{training,G}(colour_G|\overline{hand})$ a Bayesian classifier $p_G(hand|colour_{s,G})$ is determined. It is enqueued as a first classifier in a sequence of classifiers, thus forming the first node $Q_1$ of a classification cascade tree Q. The classifier represented by node $Q_1$ serves for classifying image samples regarding whether or not a respective sample is a hand sample or a non-hand sample.

Figure 4C:
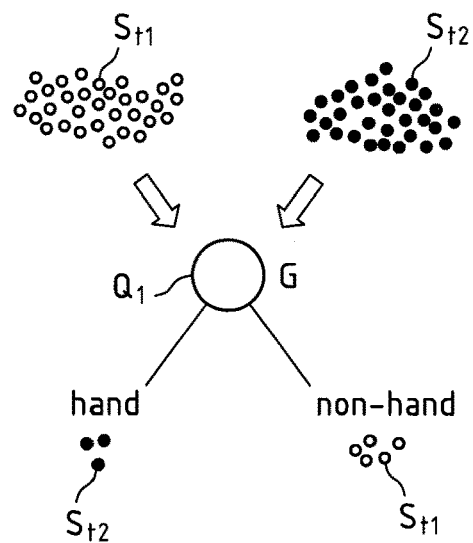
FIG. 4c: a graphic illustration schematically illustrating the next three steps of the flowchart of FIG. 3.

FIG. 4c shows a graphic illustration schematically illustrating steps 218 to 220 of the flowchart of FIG. 3.

The training samples of the first set $S_{t1}$ and of the second set $S_{t2}$ are classified according to the classifier $p_G(hand|colour_{s,G})$ of node $Q_1$ taking into account the threshold value T. As explained above, the classifier is exclusively associated with colour channel G. As can be seen in FIG. 4c, some training samples of the first set $S_{t1}$ are classified as non-hand samples (they are therefore shown on the right hand side in the lower part of FIG. 4c) although they actually do comprise optical information on a human hand. Likewise, the training samples of the second set $S_{t2}$ that are shown on the left hand side in the lower part of FIG. 4c are classified as hand samples although they are actually non-hand samples. The other training samples are discarded from the first set $S_{t1}$ and the second set $S_{t2}$. Only the misclassified samples remain in the first set $S_{t1}$ and the second set $S_{t2}$. If the number of training samples in the first set $S_{t1}$ and the second set $S_{t2}$ is too low, initially determining classification information terminates at this point. If not, the steps explained with respect to FIG. 4a, FIG. 4b and FIG. 4c are repeated based on the modified first set and second sets $S_{t1}$, $S_{t2}$. Therein, colour channel G is not considered anymore so that a newly determined classifier is associated with a different colour channel.

Figure 4D:
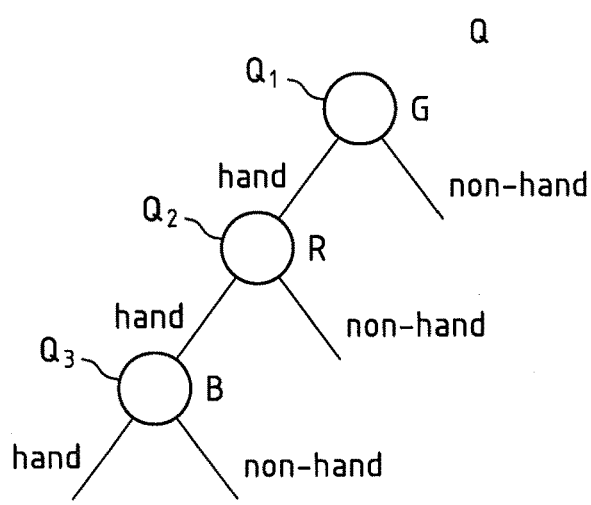
FIG. 4d: a schematic illustration of an example of a classification cascade tree obtained by performing the steps of the flowchart of FIG. 3.

FIG. 4d shows a schematic illustration of an example of a classification cascade tree Q obtained by performing the steps of the flowchart of FIG. 3.

The classification cascade tree Q comprises three nodes $Q_1$, $Q_2$ and $Q_3$. Each of the nodes represents a classifier of a plurality of classifiers. In the classification cascade tree Q, a sequence of the nodes and thus of the plurality of classifiers is defined. According to the present example, the classifier represented by node $Q_1$ is associated with colour channel G, the classifier represented by node $Q_2$ is associated with colour channel R and the classifier represented by node $Q_3$ is associated with colour channel B. although colour channel R and colour channel B are generally less well suited for classifying the training samples, they are still useful in conjunction with the classifier represented by node $Q_1$ for refining classification results. An image sample that is classified according to classification cascade tree Q is finally classified as a hand sample only if it is classified as a hand sample according to each classifier of the plurality of classifiers.

Again referring to FIG. 2, after the classification information has been determined in step 210, a first image of the image sequence is provided in step 221. Then, in step 230 the samples of the first image are classified according to the classification information determined in step 210. Thereafter, the classification information is updated in step 240.

Figure 5:
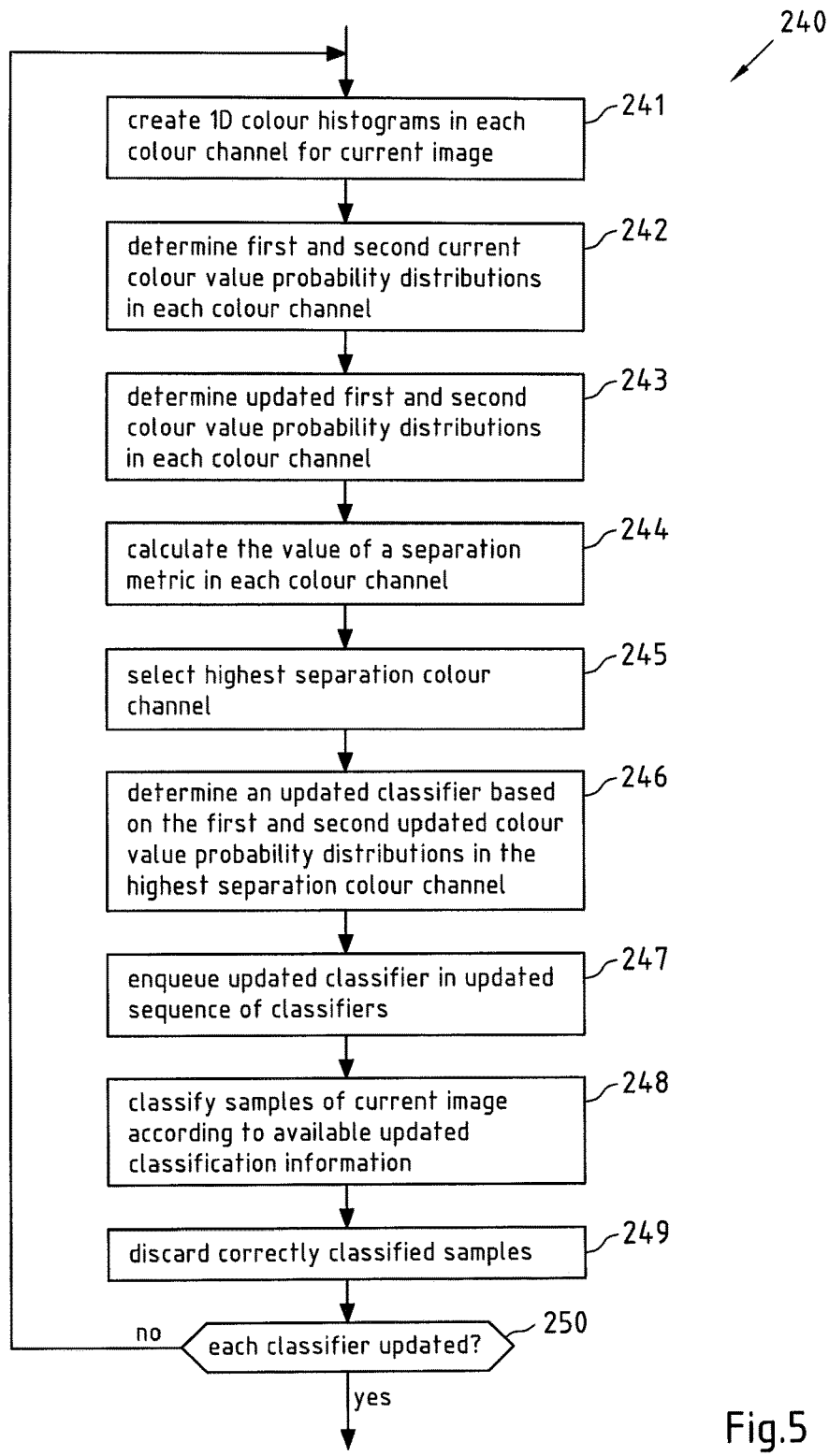
FIG. 5: a flowchart schematically illustrating updating the classification information in the context of the second embodiment of a method according to the first aspect of the present invention.

FIG. 5 shows a flowchart schematically illustrating updating the classification information in the context of the second embodiment of a method according to the first aspect of the present invention, i.e. FIG. 5 shows in more detail the steps performed in the course of performing step 240 of the flowchart of FIG. 2.

In step 241, for the currently considered image (current image) of the image sequence, i.e. for the first image of the image sequence if step 241 is performed for the first time, 1D colour histograms are created in each colour channel i of the plurality of colour channels I. Therein, a first colour histogram is created for image samples of the current image that have been classified as hand samples in step 230 of the flowchart of FIG. 2. Those samples may be considered to be allotted to a first set of samples $S_{c1}$ of the current image. A second colour histogram is created for image samples of the current image that have been classified as non-hand samples in step 230. Those samples may be considered to be allotted to a second set of samples $S_{c2}$ of the current image. Together the first set of samples $S_{c1}$ and the second set of samples $S_{c2}$ form a set of samples $S_c$ of the current image.

Based on the first and second 1D colour histograms, first current colour value probability distributions $p_{c,i}(colour_i|hand)$ and second current colour value probability distributions $p_{c,i}(colour_i|\overline{hand})$ are determined in each colour channel i in step 242.

In step 243, updated first colour value probability distributions $p_{u,i}(colour_i|\overline{hand})$ and updated second colour value probability distributions $p_{u,i}(colour_i|hand)$ are determined in each colour channel i of the plurality of colour channels I. Therein, each updated first colour value probability distribution $p_{c,i}(colour_i|hand)$ is based on a weighted sum of a first current colour value probability distribution $p_{c,i}(colour_i|hand)$ in the respective the colour channel i and of a first previous colour value probability distribution $p_{p,i}(colour_i|hand)$ in the respective colour channel i. When step 243 is performed for the first time, the first previous colour value probability distribution in the respective colour channel i is the first training colour value probability distribution $p_{training,i}(colour_i|hand)$ in that colour channel. Likewise, each updated second colour value probability distribution $p_{u,i}(colour_i|\overline{hand})$ is based on a weighted sum of a second current colour value probability distribution $p_{c,i}(colour_i|\overline{hand})$ in the respective colour channel i and of a second previous colour value probability distribution $p_{p,i}(colour_i|hand)$ in the respective colour channel i. When step 243 is performed for the first time, the second previous colour value probability distribution in the respective colour channel i is the second training colour value probability distribution $p_{training,i}(colour_i|\overline{hand})$ in that colour channel.

In the present example, the first updated colour value probability distribution is calculated according to the equation $$p_{u,i}(colour_i|hand)=p_{p,i}(colour_i|hand)+\lambda p_{c,i}(colour_i|hand).$$

The second updated colour value probability distribution is calculated according to the equation $$p_{u,i}(colour_i|\overline{hand})=p_{p,i}(colour_i|\overline{hand})+\lambda p_{c,i}(colour_i|\overline{hand}).$$

Therein, $\lambda$ denotes a weight for weighting the previous colour value probability distributions. In the present example, $\lambda$ is set to 0.1.

According to the equations above, current colour value probability distributions and previous colour value probability distributions are fused in updating classification information. Since $\lambda$ is smaller than 1, a current colour value probability distribution has less impact on the updated colour value probability distribution than the corresponding previous colour value probability distribution. Based on the respective previous colour value probability distribution, the updated colour value probability distribution thus evolves slowly each time updating of the classification information is performed.

With the updated colour value probability distributions evolving, classifiers determined based on them also evolve. Adapting to new conditions so that good classification results may still be obtained under these new conditions, e.g. new lighting conditions or new image background conditions, is thereby rendered possible.

Step 244 comprises calculating, in each colour channel i of the plurality of colour channels I, a value $m_i$ of a metric that is indicative of a separation of the first updated colour value probability distribution $p_{u,i}(colour_i|hand)$ and the second updated colour value probability distribution $p_{u,i}(colour_i|\overline{hand})$ in the respective colour channel i. The metric is based on the so-called Fisher Rule. Let $S_1$ denote a set of samples consisting of all the samples considered for determining the first updated colour value probability distribution $p_{u,i}(colour_i|hand)$, i.e. the samples classified as hand samples based on which the first current colour value probability distribution $p_{c,i}(colour_i|hand)$ has been determined and the samples classified as hand samples based on which the first previous colour value probability distribution $p_{p,i}(colour_i|hand)$ has been determined. Likewise, let $S_2$ denote a set of samples consisting of all the samples considered for determining the second updated colour value probability distribution $p_{u,i}(colour_i|\overline{hand})$, i.e. the samples classified as non-hand samples based on which the second current colour value probability distribution $p_{c,i}(colour_i|\overline{hand})$ has been determined and the samples classified as non-hand samples based on which the second previous colour value probability distribution $p_{p,i}(colour_i|\overline{hand})$ has been determined. The value $m_i$ of the metric may then be determined according to the following equations:

$$m_i = \frac{(L_1 - L_2)^2}{R_1^2 + R_2^2}$$

$$L_1 = \frac{1}{|S_{t1}|} \sum_{s \in S_{t1}} colour_{s,i} \qquad L_2 = \frac{1}{|S_{t2}|} \sum_{s \in S_{t2}} colour_{s,i}$$

$$R_1 = \sum_{s \in S_{t1}} (colour_{s,i} - L_1)^2 \qquad R_2 = \sum_{s \in S_{t2}} (colour_{s,i} - L_2)^2$$

In step 245, the colour channel i for which the value $m_i$ of the metric is indicative of the highest separation of the first updated colour value probability distribution $p_{u,i}(colour_i|hand)$ and the second updated colour value probability distribution $p_{u,i}(colour_i|\overline{hand})$ is selected as a highest separation colour channel sep.

Step 246 comprises determining an updated Bayesian classifier $p_u(hand|colour_{s,sep})$ based on the first updated colour value probability distribution $p_{u,sep}(colour_{sep}|hand)$ and the second updated colour value probability distribution $p_{u,sep}(colour_{sep}|\overline{hand})$ in the highest separation colour channel sep. According to Bayes' theorem the Bayesian classifier $p_u(hand|colour_{s,sep})$ may be determined according to the following equation:

$$p_u(hand \mid colour_{s,sep}) = p_u(colour_{s,sep} \mid hand) \cdot \frac{p(hand)}{p(hand) \cdot p_{u,sep}(colour_{s,sep} \mid hand) + p(\overline{hand}) \cdot p_{u,sep}(colour_{s,sep} \mid \overline{hand})}$$

In step 247, the updated classifier determined in step 246 is enqueued in an updated sequence of classifiers. As initially only one updated classifier has been determined so far, by enqueueing that updated classifier in the updated sequence, it becomes the first updated classifier in the updated sequence. The updated sequence of classifiers constitutes updated classification information.

Step 248 comprises classifying the samples of the set of samples $S_c$ of the current image according to the available updated classification information. A sample s of the set $S_c$ is classified as a hand sample if $$p_u(hand|colour_{s,sep}) \geq T.$$

Otherwise, the sample s is classified as a non-hand sample.

Alternatively, a sample s may be considered as a non-hand sample if $$p_u(\overline{hand}|colour_{s,sep}) \geq T.$$

Otherwise, the sample s may be classified as a hand sample.

It is noted that the above threshold values are merely exemplary and that in particular the threshold value for considering a sample a hand sample and the threshold value for considering a sample a non-hand sample may be different.

A sample s of the first subset $S_{c1}$ of $S_c$ is considered to have been classified correctly if it has been classified as a hand sample. A sample s of the second subset $S_{c2}$ of $S_c$ is considered to have been classified correctly if it has been classified as a non-hand sample.

In step 249, correctly classified samples are discarded from the set $S_c$.

It is checked in step 250 if each classifier of the plurality of classifiers has been updated. If so, updating the classification information is finished and it is continued with performing step 260 of the flowchart depicted in FIG. 2. If not, it is returned to step 241 and the updating steps 241 to 250 are once again performed. Therein, samples discarded from the set of samples $S_c$ of the current image are not considered anymore. Furthermore, the colour channel identified as the highest separation colour channel in step 245 is not considered anymore. Consequently, each updated classifier is associated with a different colour channel.

Having discarded the correctly classified samples, only samples misclassified in step 248 remain in $S_c$, i.e. in $S_{c1}$ and in $S_{c2}$. Thus, the data basis for updating the remaining classifiers has been refined.

When 1D colour histograms are once again created based on the samples of the set $S_{c1}$ and set $S_{c2}$, less computational effort is required due to the reduced number of samples that have to be considered.

The 1D colour histograms and thus the first current colour value probability distribution $p_{c,i}(colour_i|hand)$ and the second current colour value probability distribution $p_{c,i}(colour_i|\overline{hand})$ are therefore based only on samples that have previously been misclassified in step 248. However, as long as the current image remains the same, the first previous colour value probability distribution $p_{p,i}(colour_i|hand)$ and the second previous colour value probability distribution $p_{p,i}(colour_i|\overline{hand})$ remain unchanged.

By enqueueing the newly updated classifier in the sequence of classifiers in step 247, the newly updated classifier becomes the next classifier in the updated sequence of classifiers. An updated classification cascade tree $Q_u$ is obtained. In this context, the classifiers of the plurality of classifiers may be referred to as nodes $Q_{u1}, Q_{u2}, \ldots, Q_{un}$ of the updated classification cascade tree.

Each time step 248 is performed, for each of the samples of the set of samples $S_c$ of the current image, going through the plurality of updated classifiers so far determined according to the updated sequence and classifying the respective sample is carried out. According to the embodiment presently discussed, a sample s is finally classified as a hand sample only if it is classified as a hand sample according to each updated classifier so far determined. Going through the updated classifiers according to the updated sequence therefore terminates for the respective sample if it has been classified as a non-hand sample according to only one updated classifier.

Figure 6:
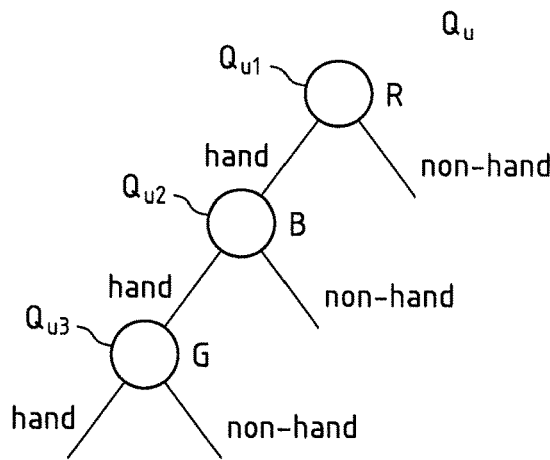
FIG. 6: a schematic illustration of an example of an updated classification cascade tree obtained by performing the steps of the flowchart of FIG. 5.

FIG. 6 shows a schematic illustration of an example of an updated classification cascade tree $Q_u$ obtained by performing the steps of the flowchart of FIG. 5. The updated classification cascade tree $Q_u$ comprises three nodes $Q_{u1}$, $Q_{u2}$ and $Q_{u3}$ representing the updated classifiers. Since updating the classifiers involves newly determining a highest separation colour channel for each updated classifier, the first updated classifier represented by $Q_{u1}$ may be associated with a different colour channel than the first classifier represented by node $Q_1$ of the classification cascade tree Q before the update (see FIG. 4*d*). The same applies for the other classifiers of the updated classification cascade tree. Namely, the classifier represented by node $Q_1$ is associated with colour channel G, while the updated classifier $Q_{u1}$ is associated with colour channel R. The classifier represented by node $Q_2$ is associated with colour channel R, while the updated classifier $Q_{u2}$ is associated with colour channel B. The classifier represented by node $Q_3$ is associated with colour channel B, while the updated classifier $Q_{u3}$ is associated with colour channel G.

The updated classification information may contribute to enabling obtaining good classification results for samples of subsequent images of the image sequence, even if conditions change, e.g. if the lighting conditions and the image background vary. It may thereby be attained that a human hand may be reliably segmented in each image of the image sequence so that hand gesture tracking is possible. Hand gesture tracking may be employed in user interfaces that enable convenient and intuitive operation of a device.

Figure 7:
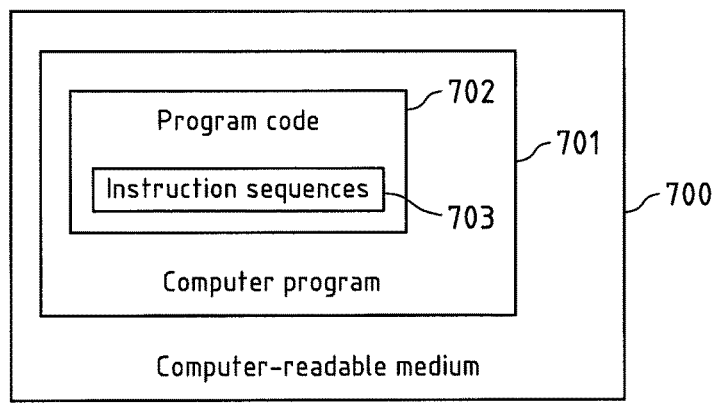
FIG. 7: a schematic illustration of an embodiment of a computer-readable medium according to the third aspect of the present invention, which also constitutes an embodiment of a computer program product according to the fourth and likewise according to the fifth aspect of the present invention, comprising an embodiment of a computer program according to the third aspect of the present invention.

FIG. 7 shows a schematic illustration of an embodiment of a computer-readable medium 700 according to the third aspect of the present invention, which also constitutes an embodiment of a computer program product according to the fourth and likewise according to the fifth aspect of the present invention, comprising an embodiment of a computer program 701 according to the third aspect of the present invention.

Computer-readable medium 700 is a tangible storage medium. It may for instance be embodied as an electric, magnetic, electro-magnetic, optic or other computer-readable medium. It may either be a removable medium or a medium that is fixedly installed in an apparatus or device, such as for instance the apparatus 800 that will be explained with reference to FIG. 8.

Figure 8:
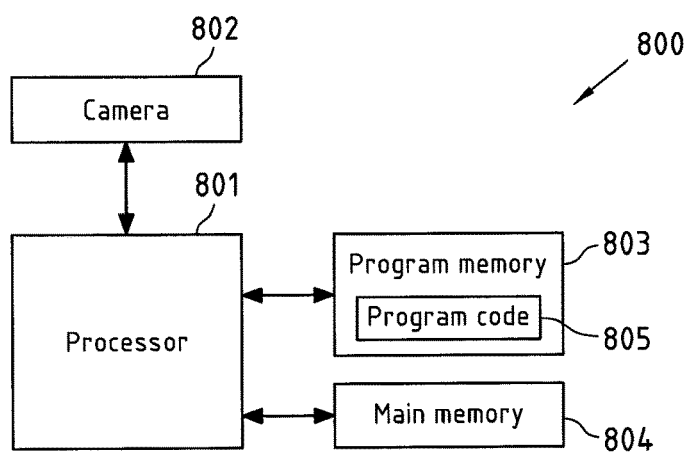
FIG. 8: a schematic illustration of an embodiment of an apparatus 800 according to the sixth, seventh, eighth and ninth aspect of the present invention.

Computer-readable medium 700 stores a computer program 701 with program code 702 for performing the method according to the first aspect of the present invention when said computer program is executed on a processor, such as processor 801 depicted in FIG. 8. Program code 702 may for instance implement the method of the flowchart 200 of FIG. 2 and thus of the flowcharts in FIG. 3 and in FIG. 5. The computer program 701 thus constitutes an embodiment of a computer program according to the second aspect of the present invention.

Computer-readable medium 700 also forms an embodiment of a computer-readable medium according to the third aspect of the present invention.

Computer-readable medium 700 is also a computer readable non-transitory memory medium having the program code 702 stored thereon. When the program code 702 is executed by an apparatus, such as for instance apparatus 800 that will be explained with reference to FIG. 8, the program code 702 causes the apparatus to classify samples of a set of samples of an image regarding whether or not a respective sample comprises optical information on a specific object based on classification information, wherein the classification information comprises a plurality of classifiers, each classifier being associated exclusively with one colour channel of a plurality of colour channels. Computer-readable medium 700 is thus also an embodiment of a computer program product according to the fourth aspect of the present invention.

Program code 702 comprises instruction sequences 703. Each instruction sequence thereof comprises one or more instructions. When the instruction sequences 703 are executed by one or more processors, such as processor 801 depicted in FIG. 8, they cause an apparatus, such as for instance the apparatus 800 that will be explained with reference to FIG. 8, at least to classify samples of a set of samples of an image regarding whether or not a respective sample comprises optical information on a specific object based on classification information. Therein, the classification information comprises a plurality of classifiers, each classifier being associated exclusively with one colour channel of a plurality of colour channels. Computer-readable medium 700 is thus also an embodiment of a computer program product according to the fifth aspect of the present invention.

FIG. 8 shows a schematic illustration of an embodiment of an apparatus 800 according to the sixth, seventh, eighth and ninth aspect of the present invention.

Apparatus 800 comprises a processor 801, which communicates with a camera 802, a program memory 803, a main memory 804. Program memory 803 may for instance be embodied by computer-readable medium 700 of FIG. 7. Program memory 803 may be fixedly attached in apparatus 800 or may be a removable memory.

Main memory 804 is used by processor 801 as a working memory, for instance to store intermediate results and variables.

When processor 801 executes computer program code 805 stored in program memory 803, e.g. computer program code 702 in case of program memory 803 being embodied by computer-readable medium 700 of FIG. 7, program memory 803, main memory 804, and computer program code 805 together with processor 801 cause apparatus 800 at least to perform the method according to the first aspect of the present invention. For instance, apparatus 800 may perform the method of the flowchart of FIG. 2 and thus also of the flowcharts of FIG. 3 and of FIG. 5. Apparatus 800 thus constitutes an embodiment of an apparatus according to the eight aspect of the present invention.

Apparatus 800 thus also constitutes an embodiment of an apparatus according to the seventh aspect of the present invention.

Program memory 803 together with computer program code 805, main memory 804, and processor 801 are an embodiment of means for performing an embodiment of a method according to the first aspect of the present invention. Apparatus 800 thus also constitutes an embodiment of an apparatus according to the sixth aspect of the present invention.

The above means are means for classifying samples of a set of samples of an image regarding whether or not a respective sample comprises optical information on a specific object based on classification information, wherein the classification information comprises a plurality of classifiers, each classifier being associated exclusively with one colour channel of a plurality of colour channels. Apparatus 800 therefore also constitutes an embodiment of an apparatus according to the ninth aspect of the present invention.

Camera 802 serves for acquiring images of a user's hand. These images are provided to processor 801, so that samples of the images acquired by camera 802 may be classified regarding whether or not they are hand samples. By means of classifying the image samples, hand segmentation is performed in each image and the user's hand is tracked throughout an image sequence acquired by camera 802. The program code 805 comprises instructions that, when executed by processor 801, cause the processor to perform hand gesture recognition based on the tracked hand. Processor 801 controls apparatus 800 according to recognised hand gestures. Camera 802 is thus a user interface of apparatus 800.

Apparatus 800 may for instance be entirely implemented as a module that may for instance be integrated into another device. Apparatus 800 may for instance be entirely implemented as a circuit on a semiconductor chip. Apparatus 800 may for instance be entirely implemented on a Digital Signal Processor (DSP), Application Specific Integrated Circuit (ASIC) or Field Programmable Gate Array (FPGA), to name but a few examples.

The invention has been described above by means of embodiments, which shall be understood to be non-limiting examples. In particular, it should be noted that there are alternative ways and variations which are obvious to a skilled person in the art and can be implemented without deviating from the scope and spirit of the appended claims. It should also be understood that the sequence of method steps in the flowcharts presented above is not mandatory, also alternative sequences may be possible.

What is claimed is:

1. A method comprising:
    classifying samples of a set of samples of an image regarding whether or not a respective sample comprises optical information on a specific object type based on classification information, wherein the classification information comprises a plurality of classifiers, each classifier being associated exclusively with one colour channel of a plurality of colour channels, wherein a sequence of the plurality of classifiers is defined by enqueueing said each classifier in the sequence;
    tracking an object of the specific object type in a plurality of images;
    going through, for the plurality of images, the plurality of classifiers according to the sequence;
    classifying the plurality of images as comprising optical information on a specific object type only if the plurality of images are classified as comprising optical information on the specific object type according to each classifier of the sequence of the plurality of classifiers;
    updating at least parts of the classification information comprising updating the plurality of classifiers or the sequence of the plurality of classifiers by at least:
        determining in each colour channel of the plurality of colour channels an updated colour value probability distribution of samples classified as comprising optical information on the specific object type; and
        fusing a current colour value probability distribution of a current image and a previous colour value probability distribution of a previous image, wherein each updated colour value probability distribution is based on a weighted sum of the current colour value probability distribution in the respective colour channel and of the previous colour value probability distribution in the respective colour channel; and
    using the updated classification information to classify a subsequent image as comprising optical information on the specific object type.

2. The method of claim 1, wherein the method comprises initially determining at least parts of the classification information.

3. The method of claim 2, wherein initially determining at least parts of the classification information comprises determining, in each colour channel of the plurality of colour channels:
    a first training colour value probability distribution of a first set of training samples, wherein the samples of the first set of training samples have been classified as comprising the optical information on the specific object type; and
    a second training colour value probability distribution of a second set of training samples, wherein the samples of the second set of training samples have been classified as not comprising the optical information on the specific object type.

4. The method of claim 1, wherein updating at least parts of the classification information comprises determining, in each colour channel of the plurality of colour channels:
    an updated first colour value probability distribution of samples classified as comprising the optical information on the specific object type; and
    an updated second colour value probability distribution of samples classified as not comprising the optical information on the specific object type.

5. An apparatus, comprising at least one processor and at least one memory including computer program code, said at least one memory and said computer program code configured to, with said at least one processor, cause said apparatus at least to:
    classify samples of a set of samples of an image regarding whether or not a respective sample comprises optical information on a specific object based on classification information, wherein the classification information comprises a plurality of classifiers, each classifier being associated exclusively with one colour channel of a plurality of colour channels, wherein a sequence of the plurality of classifiers is defined by enqueueing said each classifier in the sequence;
    track an object of the specific object type in a plurality of images;
    go through, for the plurality of images, the plurality of classifiers according to the sequence;
    classify the plurality of images as comprising optical information on a specific object type only if the plurality of images are classified as comprising optical information on the specific object type according to each classifier of the sequence of the plurality of classifiers;

update at least parts of the classification information comprising updating the plurality of classifiers or the sequence of the plurality of classifiers by at least:

determining in each colour channel of the plurality of colour channels an updated colour value probability distribution of samples classified as comprising optical information on the specific object type; and fusing a current colour value probability distribution of a current image and a previous colour value probability distribution of a previous image, wherein each updated colour value probability distribution is based on a weighted sum of the current colour value probability distribution in the respective colour channel and of the previous colour value probability distribution in the respective colour channel; and use the updated classification information to classify a subsequent image as comprising optical information on the specific object type.

6. The apparatus of claim 5, wherein the apparatus further comprises to: classify the respective sample as comprising the optical information on the specific object type only if the respective sample is classified as comprising the optical information on the specific object type according to each classifier of the plurality of classifiers.

7. The apparatus of claim 5, wherein the apparatus further comprises to: initially determine at least parts of the classification information.

8. The apparatus of claim 7, wherein initially determining at least parts of the classification information comprises to: determine, in each colour channel of the plurality of colour channels:

a first training colour value probability distribution of a first set of training samples, wherein the samples of the first set of training samples have been classified as comprising the optical information on the specific object type; and a second training colour value probability distribution of a second set of training samples, wherein the samples of the second set of training samples have been classified as not comprising the optical information on the specific object type.

9. The apparatus of claim 8, wherein initially determining at least parts of the classification information comprises to:

calculate, in each colour channel of the plurality of colour channels, a value of a metric that is indicative of a separation of the first training colour value probability distribution and the second training colour value probability distribution in the respective colour channel;

select as a highest separation colour channel the colour channel of the plurality of colour channels for which the value of the metric is indicative of the highest separation of the first training colour value probability distribution and the second training colour value probability distribution; and determine a classifier of the plurality of classifiers based on the first training colour value probability distribution and the second training colour value probability distribution in the highest separation colour channel, thereby associating the classifier with the highest separation colour channel.

10. The apparatus of claim 9, wherein initially determining at least parts of the classification information comprises to: define the sequence of the plurality of classifiers, wherein the classifier associated with the highest separation colour channel is enqueued in the sequence of the plurality of classifiers.

11. The apparatus of claim 8, wherein initially determining at least parts of the classification information comprises to:

classify the training samples of the first set and the training samples of the second set based on available classification information;

discard correctly classified training samples of the first set from the first set; and discard correctly classified training samples of the second set from the second set.

12. The apparatus of claim 5, wherein updating at least parts of the classification information comprises to: determine, in each colour channel of the plurality of colour channels:

an updated first colour value probability distribution of samples classified as comprising the optical information on the specific object type; and an updated second colour value probability distribution of samples classified as not comprising the optical information on the specific object type.

13. The apparatus of claim 12, wherein:

each updated first colour value probability distribution is based on a weighted sum of a first current colour value probability distribution in the respective colour channel and of a first previous colour value probability distribution in the respective colour channel; and each updated second colour value probability distribution is based on a weighted sum of a second current colour value probability distribution in the respective colour channel and of a second previous colour value probability distribution in the respective colour channel.

14. The apparatus of claim 12, wherein updating at least parts of the classification information comprises to:

calculate, in each colour channel of the plurality of colour channels, a value of a metric that is indicative of a separation of the first updated colour value probability distribution and the second updated colour value probability distribution in the respective colour channel;

select as a highest separation colour channel of the plurality of colour channels the colour channel for which the value of the metric is indicative of the highest separation of the first updated colour value probability distribution and the second updated colour value probability distribution; and determine an updated classifier based on the first updated colour value probability distribution and the second updated colour value probability distribution in the highest separation colour channel, thereby associating the updated classifier with the highest separation colour channel.

15. The apparatus of claim 14, wherein updating at least parts of the classification information comprises to: define an updated sequence of the plurality of classifiers, wherein the updated classifier associated with the highest separation colour channel is enqueued in the updated sequence of the plurality of classifiers.

16. The apparatus of claim 5, wherein updating at least parts of the classification information comprises to:

classify the samples of the set of samples of the image based on available updated classification information; and discard correctly classified samples of the set of samples from the set of samples.

17. The method of claim 1, wherein the plurality of classifiers is a classification cascade tree with each said classifier as a node of the classification cascade tree.

18. The apparatus of claim 5, wherein the plurality of classifiers is a classification cascade tree with each said classifier as a node of the classification cascade tree.

* * * * *